United States Patent

Chiu et al.

[11] 4,035,625
[45] July 12, 1977

[54] METHOD AND APPARATUS FOR PERFORMING BINARY EQUALIZATION IN VOICE-BAND PHASE-MODULATION MODEMS

[75] Inventors: Ran-Fun Chiu, Miami; James Bryon Sherman, North Miami; Judson Truman Gilbert, Hialeah, all of Fla.

[73] Assignee: Milgo Electronic Corporation, Miami, Fla.

[21] Appl. No.: 600,729

[22] Filed: July 31, 1975

[51] Int. Cl.² .......................................... H04B 3/14
[52] U.S. Cl. ................................ 235/152; 325/42; 333/18
[58] Field of Search ............ 235/152, 156; 325/42, 325/65; 328/165, 167; 333/18

[56] References Cited

U.S. PATENT DOCUMENTS

| | | | |
|---|---|---|---|
| 3,579,109 | 5/1971 | Hatley | 325/42 |
| 3,633,105 | 4/1972 | Lender | 325/42 |
| 3,651,316 | 3/1972 | Gibson | 235/152 |
| 3,659,229 | 4/1972 | Milton | 333/18 |

*Primary Examiner*—David H. Malzahn
*Attorney, Agent, or Firm*—Jackson & Jones Law Corporation

[57] ABSTRACT

A phase modulation modem providing switch selectable speeds on voice-band channels utilizes four phase, modified eight phase, and optimized eight phase, two amplitude modulation techniques. A binary equalizer automatically corrects for envelope delay and amplitude distortion of the carrier signal caused by the voice-band channel. Each symbol time, the X-axis error and Y-axis error for the received symbol is determined by comparing the received X and Y components with stored ideal X and Y components for that symbol. These error X and error Y values are used to modify primary and secondary equalization constants. The equalization constants, thus modified during this symbol time, are used on the next received symbol to correct for the phase and amplitude distortion measured during past symbol times. This sequence is repeated for each symbol time. Preselected equalization constants are utilized on the first symbol received. To equalize the line very rapidly at start-up, a phase training signal is sent prior to data transmission. After this "course" adjustment the equalizer operates on the received data symbols to very accurately correct the phase and amplitude distortions of the received symbols. A symbol quality signal is conveniently generated as a result of the equalizer operation.

33 Claims, 16 Drawing Figures

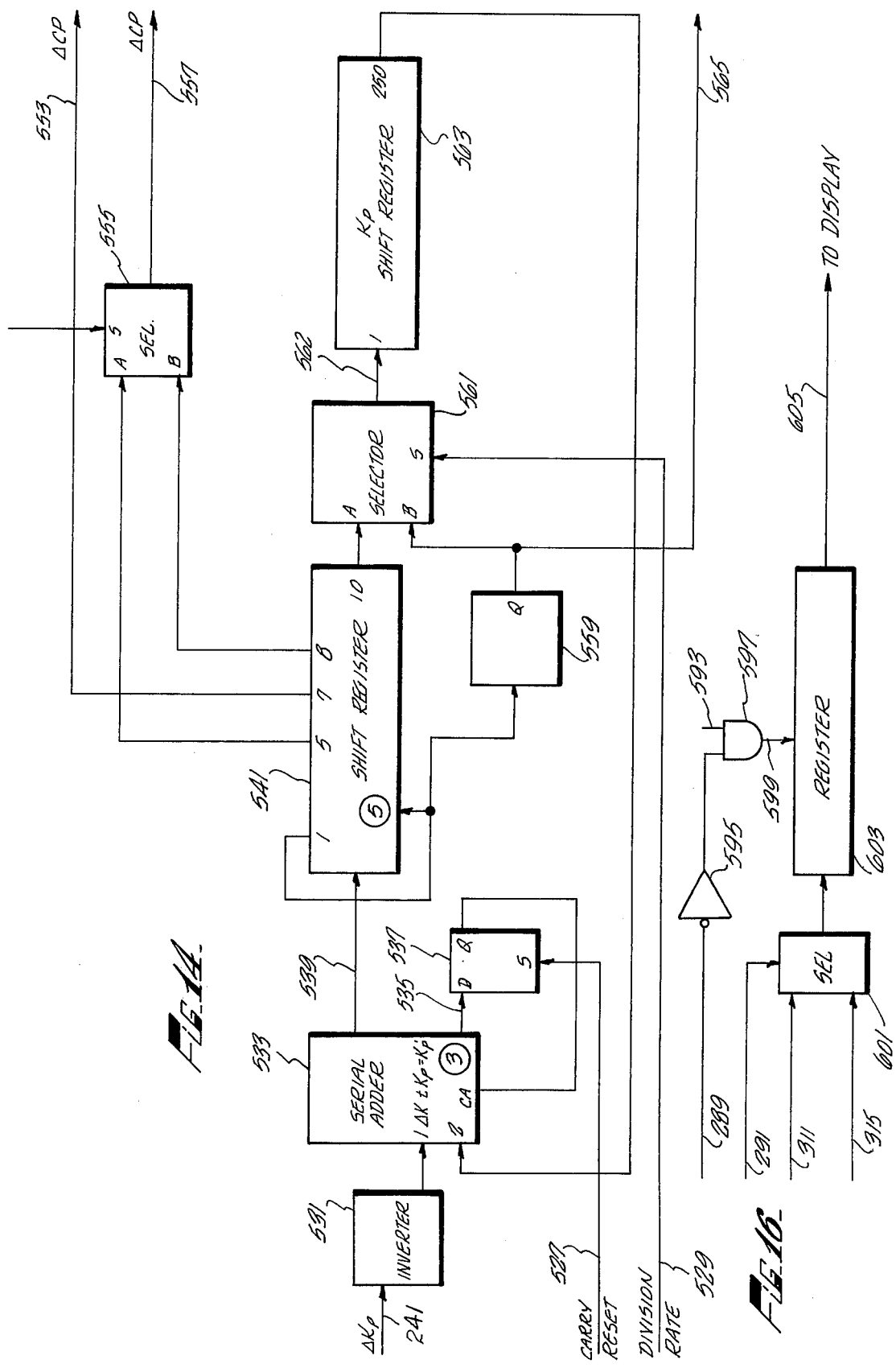

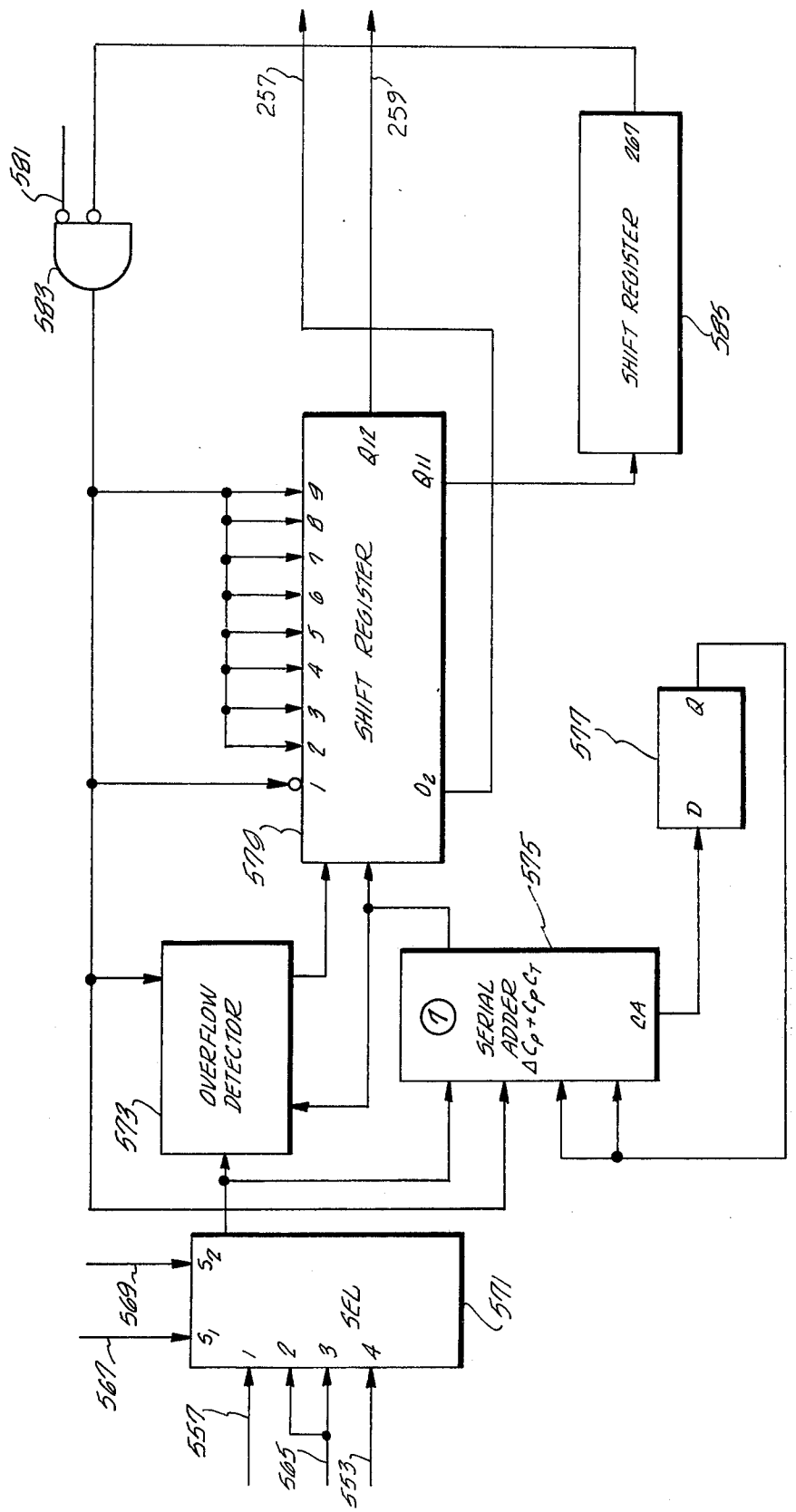

METHOD AND APPARATUS FOR PERFORMING BINARY EQUALIZATION IN VOICE-BAND PHASE-MODULATION MODEMS

BACKGROUND OF THE INVENTION

The present invention relates generally to improvements in the automatic equalization of voice-band communication channels rendering them suitable for high-speed data communication use. More particularly, it pertains to new and improved binary equalization networks wherein the amplitude and phase characteristics of various voice-band communication channels are automatically compensated for to nullify the varying degrees of attenuation and phase distortion characteristic of each different voice-band communication channel.

One of the most critical problems confronting the developers of modem devices that facilitate the use of voice-band communication channels for the high-speed transmission of digital data has been that of coping with the amplitude and phase distortion characteristic that is unique to each voice-band communication channel in the telephone network. This problem becomes increasingly difficult as the data speed increases because as the data speed increases the signal-to-noise ratio on the channel becomes evermore critical.

The prior art has attempted to overcome this problem by a variety of means. One method utilizes a passive RLC network at the receiver end. This network is designed to have attenuation and phase characteristic equal to the difference between the desired characteristics and the characteristics existing on the communication channel. The drawback behind this approach is that it does not provide any flexibility. The compensation network is only effective on the channel for which is was designed.

In order to circumvent this lack of flexibility, a compensation network known as a transversal filter is utilized. In this type of arrangement, compensation for amplitude and phase distortion is accomplished by applying the received signal to a tapped delay line. The output signal is the result of the summation of signals from several of the taps. Each tap is provided with the means of effectively multiplying its contribution by any value between ±1. This filter arrangement can compensate for a variety of amplitude and phase characteristics. A drawback in this type of system is that it is inherently slow.

Another well known type of equalizer operates on the principle of predistorting the transmitted pulses in such a way that upon reception the pulses will have the desired shape as a result of the characteristics of the transmission channel utilized. Here again however, the correction factor is static. Each communication channel must utilize its own phase distortion network.

These equalization techniques for voice-band communication channels that carry optimized eight phase, two amplitude modified eight-phase or four-phase modulated signals have been unable to provide equalization that is both flexible and can operate at speeds in the 50 millisecond range. The inability to equalize very quickly precludes prior art equalization techniques from facilitating the use of modems in controlled carrier operation or in a polling environment.

OBJECTS AND SUMMARY OF THE INVENTION

An object of this invention is to provide a fast automatic equalizer for correcting for envelope delay and amplitude distortion of a data signal.

Another object of this invention is to provide an automatic equalizer that can operate with a variety of phase modulation techniques.

Yet another object of this invention is to provide an automatic equalizer that corrects the phase and amplitude of each received symbol based on the phase and amplitude error calculated for previously received symbols.

Still another object of this invention is to provide a fast automatic equalizer for correcting for envelope delay and amplitude distortion of a double sideband carrier signal modulated according to modified eight-phase or two-level eight-phase techniques.

A further object of this invention is to provide a digital method of dynamically correcting for envelope delay and amplitude distortion of a carrier signal.

Yet a further object of this invention is to provide a method of digitally correcting the phase and amplitude of each received symbol on the phase and amplitude error calculated for previously received symbols.

Still a further object of this invention is to provide a method for dynamically correcting envelope delay and amplitude distortion of a double sideband carrier signal modulated according to modified eight-phase or two level eight-phase techniques.

These objects and the general purpose of this invention are accomplished in the following manner. By utilizing phase modulation techniques that are symmetrical in the phase plane, the same equalizer circuit may be used for various modulation techniques. The equalization circuit operates on the digital form of the received symbol to correct it for the phase and amplitude distortion as determined by use of previously received symbols. As the received symbol is being so corrected, new equalizer constants are determined for use in correcting the phase and amplitude of the next received symbol.

Each received symbol is represented to the equalizer by its X and C Cartesian coordinates. These coordinates represent the phase angle and magnitude of the received symbol which may be in any one of the four quadrants of the phase plane. The exact phase angle and magnitude (X and Y coordinates) of all possible transmitted symbols is stored in the equalizer. The phase angle and magnitude (X and Y coordinates) of the received symbol is determined as representing a certain one of the possible transmitted symbols. The X and Y coordinates of the received symbol are compared with the stored X and Y coordinates of the symbol that was assumed to have been transmitted. The difference between them produces error X and error Y factors that are used to modify the equalization constants. The modified equalization constants are used on the next received symbol. This sequence is a continuous process during data transmission.

Prior to data reception, the equalizer operates in a fast course mode on a two-phase carrier. The equalization constants used on the first symbol received as a result of the two-phase carrier are predetermined and stored in the equalizer. Subsequent equalization constants are dynamically determined.

Symbol quality is indicated by either the error X or error Y factor generated, depending on the modulation mode being utilized.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like-reference numeals designate like parts throughout the figures thereof and wherein:

FIG. 14 is a block diagram illustration of arithmetic and shift register apparatus in the equalizer utilized to execute certain equations.

FIG. 15 is a block diagram illustration of the apparatus in the equalizer utilized to execute a certain equation.

FIG. 16 is a logic diagram of a signal quality indication generating circuit.

DESCRIPTION OF THE PREFERRED EMBODIMENTS

Figure 1:
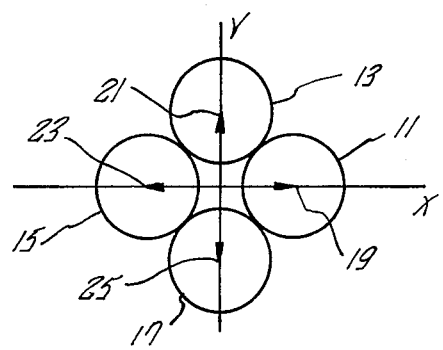
FIG. 1 is a vector diagram representing the necessary power levels for a four-phase phase-modulated signal.
Figure 2:
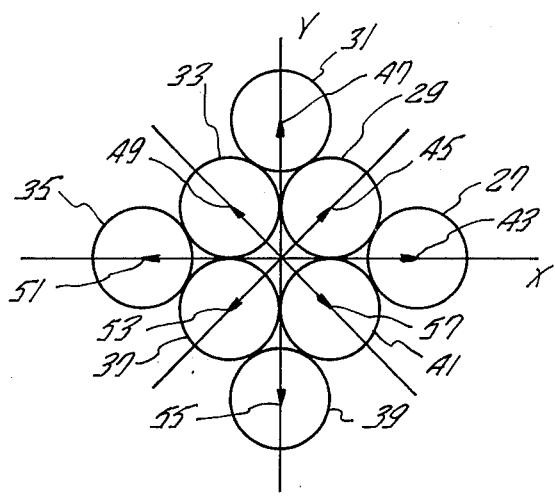
FIG. 2 is a vector diagram representative of the power levels necessary for a modulated eight-phase modulated signal.
Figure 3:
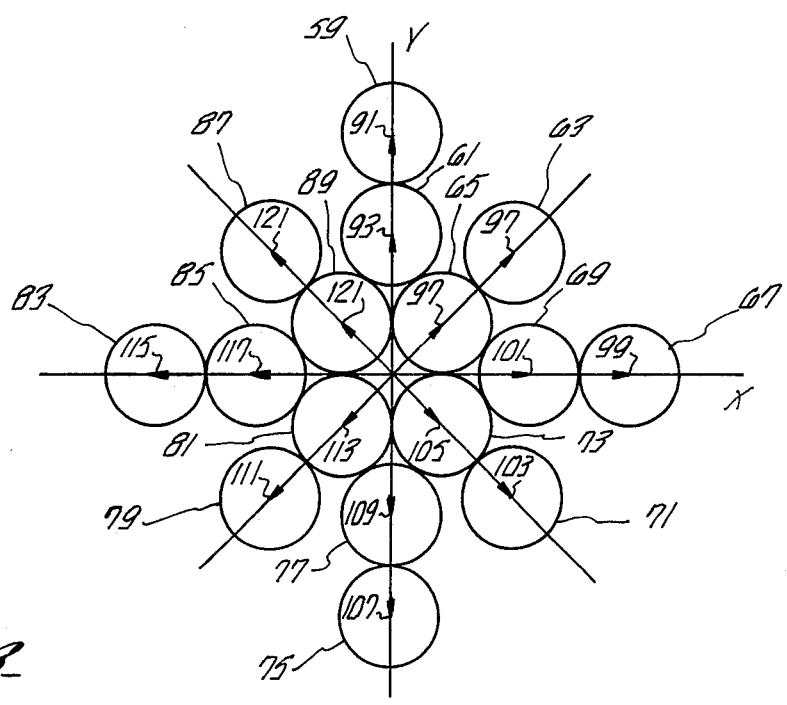
FIG. 3 is a vector diagram representative of the power required for a modified eight-phase, two-level modulated signal.

FIGS. 1, 2 and 3 are vector diagrams on a phase plane, the plane being defined by the X and Y Cartesian coordinates. The length of each vector represents the amplitude of the transmitted signal, its angle with respect to the first quadrant X axis represents the phase of the transmitted signal. FIG. 1 illustrates a four-phase phase-modulated signal having four vectors 19, 21, 23 and 25 of equal length spaced 90° apart. Each vector has an area surrounding it represented by a circle which can be thought of as the correctable decoding area. Thus, for example, 0° phase vector 19 has a decoding area 11 surrounding it. Any signal vector having sufficient amplitude and possessing a phase that will drop it within the area 11 at the receiving end of the communication channel will be interpreted as being the sinal represented by vector 19. The same is true for 90° phase vector 21, and its decoding area 13, 180° phase vector 23 and its decoding area 15, and 270° phase vector 25 and its decoding area 17.

FIG. 2 represents a modified eight-phase modulation scheme. This modulation technique employs eight different phase vectors 43, 45, 47, 49, 51, 53, 55 and 57 spaced apart by 45° and two different power levels. Four of these phase vectors, 43, 47, 51, and 55 are at one amplitude level spaced apart by 90°. The other four phase vectors 45, 49, 53, and 57 are at a lower power level, also spaced apart by 90°. The advantage of this type of modulation scheme over one that utilizes the same amplitude level for all eight phase vectors is that the total power consumption is decreased, without decreasing the signal-to-noise ratio. The concept of the decoding area 27, 29, 31, 33, 35, 37, 39 and 41 in this modified eight-phase modulation scheme is the same as that in the four-phase scheme of FIG. 1. Consequently, a phase vector falling in decoding area 27 will be interpreted at the receiving end of the communication channel as representing the data symbol ascribed to phase vector 43. Although the total power required to transmit a modified eight-phase signal is greater than that required to transmit a four-phase signal, with the same noise immunity, as illustrated in FIG. 1, the data density is increased substantially. Instead of each phase vector representing a unique combination of two binary bits as in FIG. 1, each phase vector can represent a unique combination of three binary bits. An example of such a combination follows:

| 0° | 45° | 90° | 135° | 180° | 225° | 270° | 315° |
|----|-----|-----|------|------|------|------|------|
| 0  | 0   | 0   | 1    | 1    | 1    | 1    | 0    |
| 0  | 0   | 1   | 1    | 0    | 0    | 1    | 1    |
| 0  | 1   | 1   | 1    | 1    | 0    | 0    | 0    |

FIG. 3 illustrates a modified eight-phase, two-level modulation scheme in which 16 phase vectors 99, 101, 95, 97, 91, 93, 119, 121, 115, 117, 111, 113, 107, 109, 103, 105 are utilized. Eight of the phase vectors 101, 97, 93, 121, 117, 113, 109, and 105, have a first power level and are spaced 45° apart. The other eight phase vectors 99, 95, 91, 119, 115, 111, 107, and 103, have a second amplitude level and are also spaced 45° apart, so that any phase vector is spaced 45° from any other phase vector on the plane. This means that two phase vectors must be at each one of the eight phase angles utilized. As in the modulation scheme illustrated in FIG. 1 and FIG. 2, the two-level eight-phase scheme of FIG. 3 utilizes the concept of decoding areas. Decoding areas 69, 65, 61, 89, 85, 81, 77 and 73, belong respectively to the first level phase vectors. Decoding areas 67, 63, 59, 87, 83, 79, 75, and 71, belong respectively to the second level phase vectors. Any vector signal falling into area 69, for example, at the receiving end of a voice-band communication channel will be assumed to represent the data symbol ascribed to 0° phase vector 101. Likewise, any vector signal falling into decoding area 67 at the receiving end of the communication channel will be assumed to represent the data symbol ascribed to 0° phase vector 99.

Specific modulation and demodulation apparatus to accomplish the transmission of data according to the phase modulation schemes of FIGS. 1 through 3 are well known in the art. For example, a modulation-demodulation apparatus for the modified eight-phase scheme of FIG. 2 is taught in U.S. Pat. No. 3,706,945, issued to Hidetaka Yanagidaira on Dec. 19, 1972.

MODEM ENVIRONMENT

Figure 4:
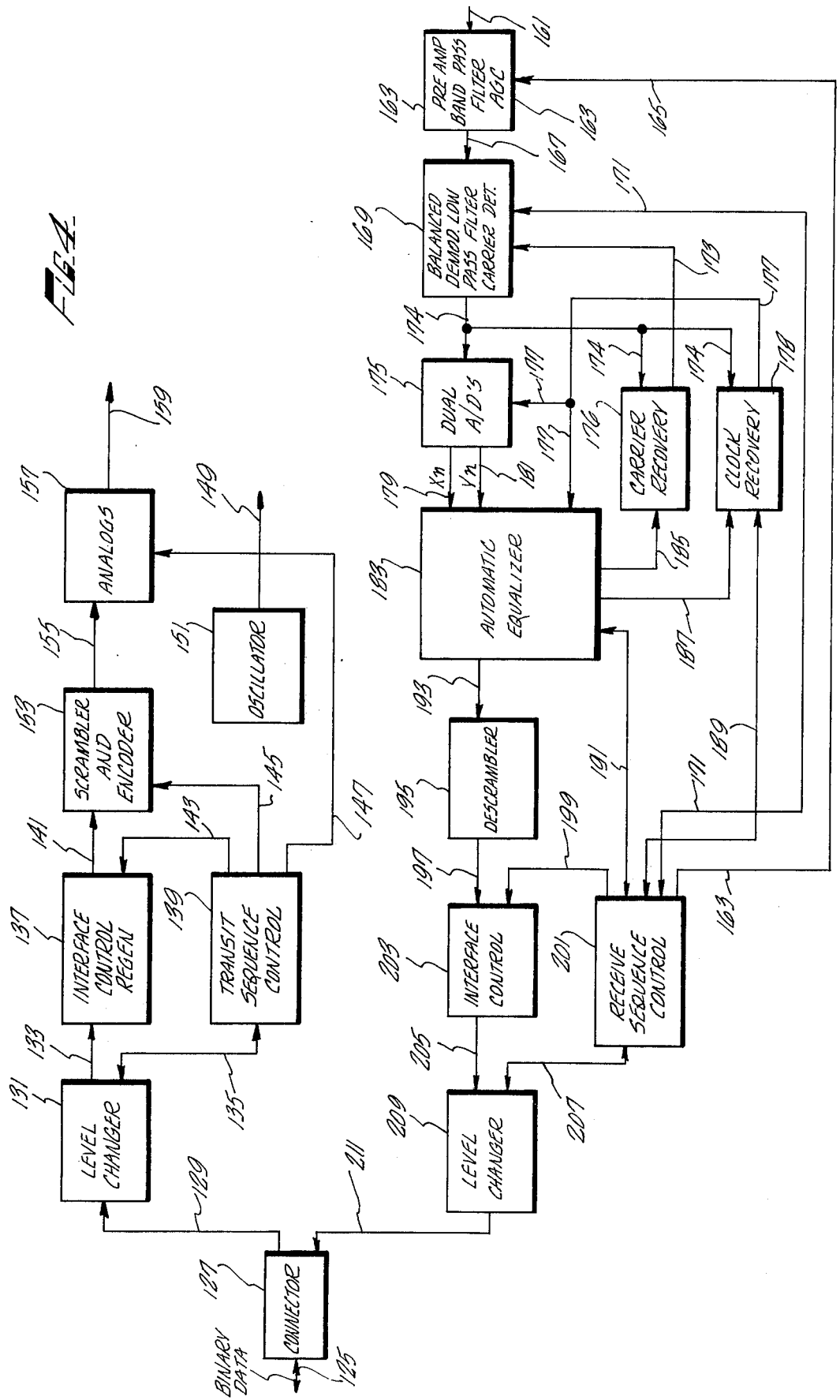
FIG. 4 is a block diagram illustrating a modem which could serve as the environment for the equalizer of the present invention.

The block diagram of FIG. 4 illustrates a type of modem that is capable of modulating and demodulating binary information according to the phase-modulation techniques of FIGS. 1, 2 and 3. Binary data from a computer or other such apparatus is received over lines 125 and by way of connector 127, is supplied to the transmitting section of the modem over line 129. The modulated information is supplied to the voice-band communication channel (not shown) for transmission to a receiving modem. Signals from the voice-band communication channel are received on line 161 and detected by the modem when in the receiving mode. The detected analog signals are converted into digital X and Y components of the received symbols, these components being supplied over lines 179 and 181 to the automatic equalizer 183. The compensated and decoded information is then supplied over line 211 to connector 127.

A brief description of the function of the illustrated modem follows. The digital, synchronous, serial, binary data on line 125 is transferred from the source and enters the connector 127. This interface conforms to the specifications as defined in the Electronic Industries Association Standard RS232C and the International Telecommunications Association Standard V.24 standard. The data to be transmitted data on line 129 enters the interface level changer 131 where the EIA bi-polar negative logic signals are received and converted to Modem usable logic levels (unipolar positive logic convention). The transmit data on line 133 is then processed by the interface control and regeneration component 137 where the internal logic is enabled and conditioned for the transmission of the data.

The data rate clock signal on line 135 is transferred to the transmit sequence control component 139. Control signals are then generated and provided to the interface control and regeneration component 137 via line 143, to the scrambler 153 via line 145, and to the analog component 157 via line 147. The oscillator 151 contains the master crystal oscillator which produces most of the timing signals on line 149 used for control throughout the Modem logic.

The transmit data on line 141 enters the scrambler and encoder component 153. The information is scrambled to give a random energy distribution and is then used to phase and amplitude modulate a transmit carrier signal. The modulated carrier signal on line 155 is then applied to the analog component 157. The analog component takes the modulated carrier signal and bandpass filters it in order to remove unwanted high frequency components.

The resultant modulated carrier signal on line 159 is fed to a line transformer which is connected to the telephone lines.

A received modulated carrier signal on line 161 enters the modem via the telephone lines connected to the receive terminals of the line transformer. This analog signal is applied to the preamp, bandpass filter, and automatic gain control (AGC) component 163. the preamp circuit amplifies the incoming line signal which provides nominal required levels for proper modem operation. The bandpass filter eliminates any signals that are outside the modem's bandpass frequencies. The AGC fast attack signal on line 165 is used to control the AGC time constant. The filtered received carrier on line 167 is applied to the balanced demodulators, low-pass filter, and carrier detect component 169. The carrier detect signal on line 171 is generated by the carrier level detector circuit and routed to the receive sequence control component 201 which conditions the receive sequence controller. A 6800 Hz signal on line 173 provides the necessary carrier frequency for the X and Y channel demodulation.

These X/Y signals are low-pass filtered to give the analog X/Y baseband signals. The analog X/Y baseband signals on line 174 are routed to the dual A/D's 175, the carrier recovery component 176, and the clock recovery component 178. The purpose of the A/D converter 175 is to convert the filtered X/Y baseband signals (analog) into a digital word of 9 amplitude bits plus a sign bit. This digital word, assembled as sign first, followed by MSB to LSB is serially shifted into the automatic equalizer 183.

The carrier recovery component operates in a fast mode of operation during the start up sequence. AT this time, it uses the analog X/Y baseband signals on line 174. It then switches to the equalizer signals on line 185 for carrier recovery. The clock recovery component recovers the clock from the incoming line signal and derives the data derived clock on line 177 which is used in the automatic equalizer 183 and the dual A/D's 175.

A signal quality signal on line 187 is integrated and then applied to the front panel for display. A clock preset signal on line 189 is generated in the receive sequence control component 201 and is used to enable the clock preset circuit of the clock recovery component 178.

The X data on line 179 data on line 181 is sent to the automatic equalizer 183 from the dual A/D's. Line 191 represents parallel control signals (formed two-level, course, and fine) which are produced in the receive sequence control component to enable the stages of the automatic equalizer sequence. The output on line 193 from the automatic equalizer 183 is the scrambled received data which is sent to the descrambler 195. The output of the descrambler on line 197 is sent to the interface control component 203. Receive data is gated with the delayed carrier detect signal on line 199 to prevent transfer of invalid received data to the level changer component 209. Interface control signals on line 207 provide communication between the data sink and the modem. The receive data on line 211 enters the connector 127 and becomes digital data 125 to the data sink.

The modem example of FIG. 4 is only one of the many types of modulation-demodulation environments in which the automatic equalizer of this invention may be utilized. For example the modulation-demodulation system described by Yanagidaira in his patent (U.S. Pat. No. 3,706,945) would benefit equally from the present invention. The automatic equalizer 183 of the present invention could be used in conjunction with the demodulation apparatus of the Yanagidaira patent.

GENERAL DESCRIPTION OF EQUALIZER

Figure 5:
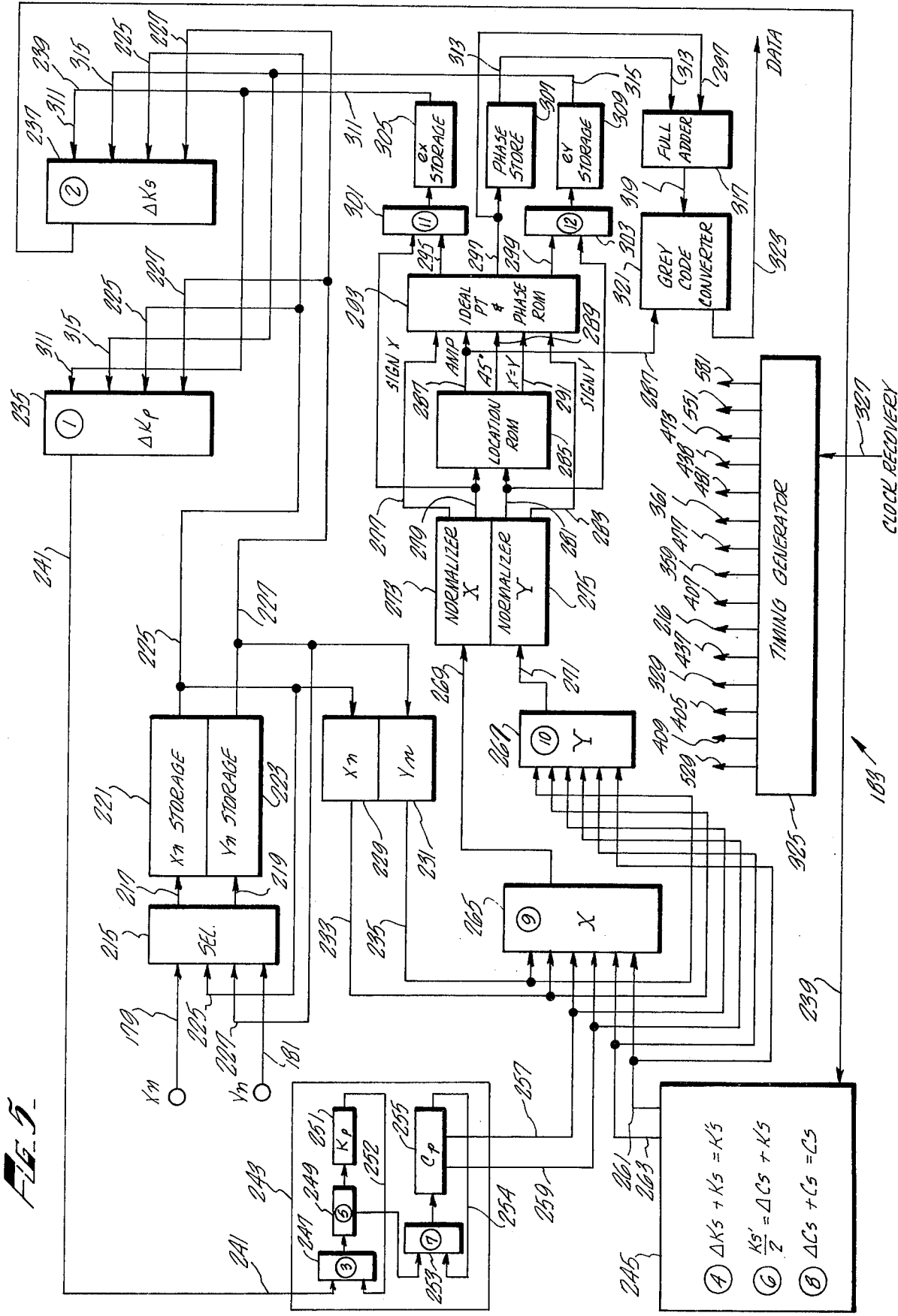
FIG. 5 is a block diagram illustration of the equalizer of the present invention.

The equalizer 183 of the present invention is more specifically illustrated in FIG. 5. The equalizer is basically a digital apparatus that executes a 12 equation algorithm for the purpose of compensating the received vector symbols for the amplitude and phase distortion caused by the communication channel. The equalizer operates on digitally represented X and Y components of each received vector symbol. The logic circuitry of the equalizer functions to perform the following 12 equation algorithm every time a new vector symbol is received and a new set of X and Y vector components is, therefore supplied to the equalizer circuit.

The equalization circuitry functions to execute the following equations:

$$e_X^{(N-1)T} X_{(N-L-1)T} + e_Y^{(N-1)T} Y_{(N-L-1)T} = -\Delta KP_L^{NT} \quad (1)$$
$$e_X^{(N-1)T} Y_{(N-L-1)T} - e_Y^{(N-1)T} X_{(N-L-1)T} = -\Delta KS_L^{NT} \quad (2)$$
$$-\Delta KP_L^{NT} + KP_L^{(N-1)T} = KP_L^{NT} \quad (3)$$
$$-\Delta KS_L^{NT} + KS_L^{(N-1)T} = KS_L^{NT} \quad (4)$$

$$\frac{KP_L^{NT}}{2^i} = \Delta CP_L^{NT} + \frac{KP_L^{NT}}{2^i} \quad (5)$$

$$\frac{KS_L^{NT}}{2^i} = \Delta CS_L^{NT} + \frac{KS_L^{NT}}{2^i} \quad (6)$$

$$\Delta CP_L^{NT} + CP_L^{(N-1)T} = CP_L^{NT} \quad (7)$$
$$\Delta CS_L^{NT} + CS_L^{(N-1)T} = CS_L^{NT} \quad (8)$$

$$\sum_{L=-10}^{14} \{CP_L^{NT} X_{(N-L)T} + CS_L^{NT} Y_{(N-L)T}\} = \underline{X}_{NT} \quad (9)$$

$$\sum_{L=-10}^{14} \{CP_L^{NT} Y_{(N-L)T} - CS_L^{NT} X_{(N-L)T}\} = \underline{Y}_{NT} \quad (10)$$

$$\underline{X}_{NT} - X_D^{NT} = e_X^{NT} \quad (11)$$
$$\underline{Y}_{NT} - Y_D^{NT} = e_Y^{NT} \quad (12)$$

For:
$L = 1, 2, \ldots, 25$ (number of taps)
$N = 1, 2, \ldots, \infty$ (integers)
$X_D^{NT}$ and $Y_D^{NT}$ = ideal points associated with received symbol
$T$ = sample interval The X and Y components of the received signal are supplied to equalizer 183 over lines 179 and 181 respectively. The preferred embodiment for these X and Y component signals is a 10 bit long binary word that indicates the sign and magnitude of the respective vector component. With such a format the X and Y components of the received vector symbol can define a vector of any length and phase angle on the phase planes illustrated in FIGS. 1 through 3.

At the time the X and Y components of a vector symbol are received a selector 215 connects input leads 179 and 181 to output leads 217, 219 respectively so that the received X and Y components are loaded into $X_N$ serial storage register 221 and $Y_N$ serial storage register 223 respectively. At all other clock times, selector 215 is set to connect input lines 225 and 227 to output lines 217 and 219 respectively. This feedback loop facilitates the retention of the $X_N$ and $Y_N$ components of the last N received vector symbol, N depending on the length of the registers 221 and 223. Thus at the reception of each new symbol represented by its X and Y components, the oldest set of X and Y components in the storage registers are effectively dropped.

Assuming for the present that the X component and Y component storage registers 221 and 223 have been filled with binary words representing the $X_N$ and $Y_N$ components of 25 symbols the reception of the next set of X and Y components activates multiplier-adders 235, 237 to execute equations 1 and 2, respectively. These multiplier-adders will be more specifically described hereinafter. It will suffice to say for the present that both multiplier-adders 235 and 237 receive the $X_N$ and $Y_N$ component values stored in registers 221 and 223 along with error X ($e_X$) and error Y ($e_Y$) values from storage registers 305 and 309 to execute for each set of X and Y components, that is 25 times, equations 1 and 2, respectively before the reception of the next X and Y components representing the next received vector symbol.

Multiplier-adder 235 generates a $\Delta KP$ value on output line 241 upon the simultaneous reception of the $X_N$ and $Y_N$ binary values on lines 225 and 227 and the $e_X$ and $e_Y$ values from storage registers 305 and 309, on lines 311 and 315, respectively. It should be remembered that these binary values are being received bit-serially from the various shift-register stores.

Multiplier-adder 237 executes equation 2 to generate a $\Delta KS$ value on output line 239 upon the simultaneous reception on lines 225 and 227 of the $X_N$ and $Y_N$ values and on lines 331 and 315 of the $e_X$ and $e_Y$ values. The $\Delta KP$ value on line 241 is sent to a correction factor generating circuit 243 which executes equations 3, 5 and 7. The $\Delta KS$ value is sent over line 239 to another correction factor generating circuit 245 which executes equations 4, 6 and 8. The logic circuitry used to execute equations 3, 5 and 7 is identical to the logic circuitry used to execute equations 4, 6 and 8. The explanation will thus proceed with a description of correction factor circuit 243, it being understood that such description applies equally to correction factor circuit 245.

The $\Delta KP$ value on line and Y data which can be thought of as a change in correction factor indicator is received at one input of full adder 247. The other input to full adder 247 is a KP value from a serial shift register 251. This register contains the 25 previously calculated KP values. Therefore, as each $\Delta KP$ value is received on line 241 the KP value from register 251 is added to it by full adder 247, the sum being supplied to register 249. This register effectively executes equation 5 by dividing the calculated KP value received from full adder 147 by a constant. The result of this division process is supplied to full adder 253 as a first input. The second input to full adder 253 is a CP value from storage register 255. Full adder 253 executes equation 7 to generate a new CP or correction factor value. This new value is supplied to storage register 255. It can be seen that the feedback loops 252 and 254 provide for a retention in the respective registers 251 and 255 of the latest N KP and CP values, N depending on the length of the registers.

Lines 257 and 259 emanating from CP storage register 255 carries a binary magnitude indication and a binary sign indication of the CP value to a multiplier-adder 265. Likewise lines 263, 261 carry binary magnitude and sign CS indications from correction factor generating circuit 245. In addition to these inputs, the multiplier-adder circuit 265 receives $X_N$ and $Y_N$ components from a pair of $X_N$, $Y_N$ serial shift registers 229, 231 over leads 233, 235, respectively. Registers 229, 231 are utilized to provide sufficient delay between the time an X and Y component value set is received on leads 179, 181 and the time the CP magnitude and sign indications and the CS magnitude and sign indications on lines 257, 259, 263, 261, respectively, are generated by the correction factor circuits 243, 245, respectively.

Multiplier-adder 267 is identical in structure to multiplier-adder 265, the only difference being a change of input so that multiplier-adder 267 executes equation 10, whereas multiplier-adder 265 executes equation 9. The specifics of multiplier-adder 265 and 267 will be more fully explained hereinafter. It will suffice for the present to say that the output of multiplier-adder 265 is the corrected X component on line 269. This corrected X component is the result of applying a correction factor to the X component received on line 179 which correction factor is based upon deviations from a norm measured for 25 previous symbol times. This is accomplished by the execution of equation 9. The other multiplier-adder 267 generates the corrected Y component according to the same principle by executing equation 10. This produces, on line 271, the corrected value of the Y component received on line 181. These corrected X and Y values on lines 269, 271, respectively, are supplied to respective normalizer circuits 273, 275.

Normalizer circuit 273 generates an absolute magnitude signal for the X component on line 279 and a sign indication on line 277. Normalizer circuit 275 generates an absolute magnitude indication for the Y component on line 281 and a sign indication on line 283. The X and Y magnitude signals are utilized to address a location ROM 285.

The location ROM contains information indicative of the first quadrant decoding areas within the received vector symbol, as identified by its corrected X and Y components belongs. In response to being addressed by these magnitude X and Y values, the location ROM may generate an amplitude indication on line 287, a 45° indication on line 289 and an X = Y indication on line 291. The binary information on lines 287, 289, and 291 can only identify the received vector symbol according to to the first quadrant locations. This information, in addition to the sign X and sign Y information on lines 277, 283 respectively, from the normalizers address an ideal point and phase ROM 293.

Since the vector symbol distribution on the phase plane, as shown in FIGS. 1, 2 and 3 is symmetrically distributed, the location ROM 285 need only carry the information identifying the decoding areas in the first quadrant. The sign X and sign Y information along with this first quadrant decoding area information can identify the vector symbols from any of the four quadrants stored in ideal point and phase ROM 293. The ideal point and phase ROM 293 contains, in addition to the X and Y coordinates of all of the ideal vector symbols utilized in the particular modulation technique chosen, the phase angle with respect to the first quadrant X axis of the particular ideal vector symbol identified. Thus, for example, for the two-level eight-phase modulation scheme, as illustrated in FIG. 3, the ideal point and phase ROM 293 contains the X and Y coordinates of all the phase vectors such as 99, 101, 95, 97, etc. and their phase angles with respect to the first quadrant X axis.

The X coordinate of the symbol vector in the decoding areas identified by the information from location ROM 285 leaves the ideal point and phase ROM 293 on lines 295. The Y coordinate of the symbol vector in the decoding area identified by location ROM 285 leaves the ideal point and phase ROM on lines 299. The phase angle of the ideal symbol vector leaves the phase ROM 293 on line 297.

Besides being supplied to a full adder 317 over line 297, the phase angle information is stored in a phase store register 307. As a new phase angle is entered into phase store register 307, the old phase angle is read out over line 313 and also supplied to full adder 317 which produces a differential of the two on line 319. This differential phase angle is converted by grey-code converter 321 into binary information on line 323. The grey-code converter produces binary data in response to the phase differential signal on line 319. In the case of a two-level eight-phase modulation scheme, such as shown in FIG. 3, an amplitude indication on line 287 is also used. The binary data generated by grey-code converter 323 therefore represents the amplitude and phase compensated information symbols received by the modem from the communication channel. In the case of modified eight phase modulation, the vector symbols to binary conversion is illustrated in the above table.

The magnitude of the ideal X coordinate on line 295 is subtracted from the magnitude indication of the corrected X coordinate received from the X normalizer 273 in full adder 301. The difference, error X ($e_X$), is stored in error X storage register 305. The magnitude of the ideal Y coordinate on line 299 is subtracted fromm the magnitude indication of the corrected Y coordinate received from Y normalizer 275 in full adder 303 to produce a difference that is the Y error value ($e_Y$). This difference is stored in error Y storage register 309. The error X and error Y storage values in registers 305 and 309 respectively are used by multiplier-adders 235 and 237 for calculating the ΔKP and ΔKS values respectively upon the reception of the next symbol vector.

This completes one full vector symbol compensation cycle. As a result, the vector symbol received 26 symbol times prior to the symbol time that started this cycle is compensated for amplitude and phase distortion due to the communication channel. Each received vector symbol will be so compensated in turn. This cycle repeats itself for each symbol time which, in a practical system, may be around 417 microseconds. The above cycle is illustrative of normal operation after initial equalization has taken place. The initial equalization cycle operates with only two vector symbols of equal amplitude for a short period of time during the initialization stage.

SAMPLING AND STORAGE OF VECTOR SYNBOL COMPONENTS

Figure 6:
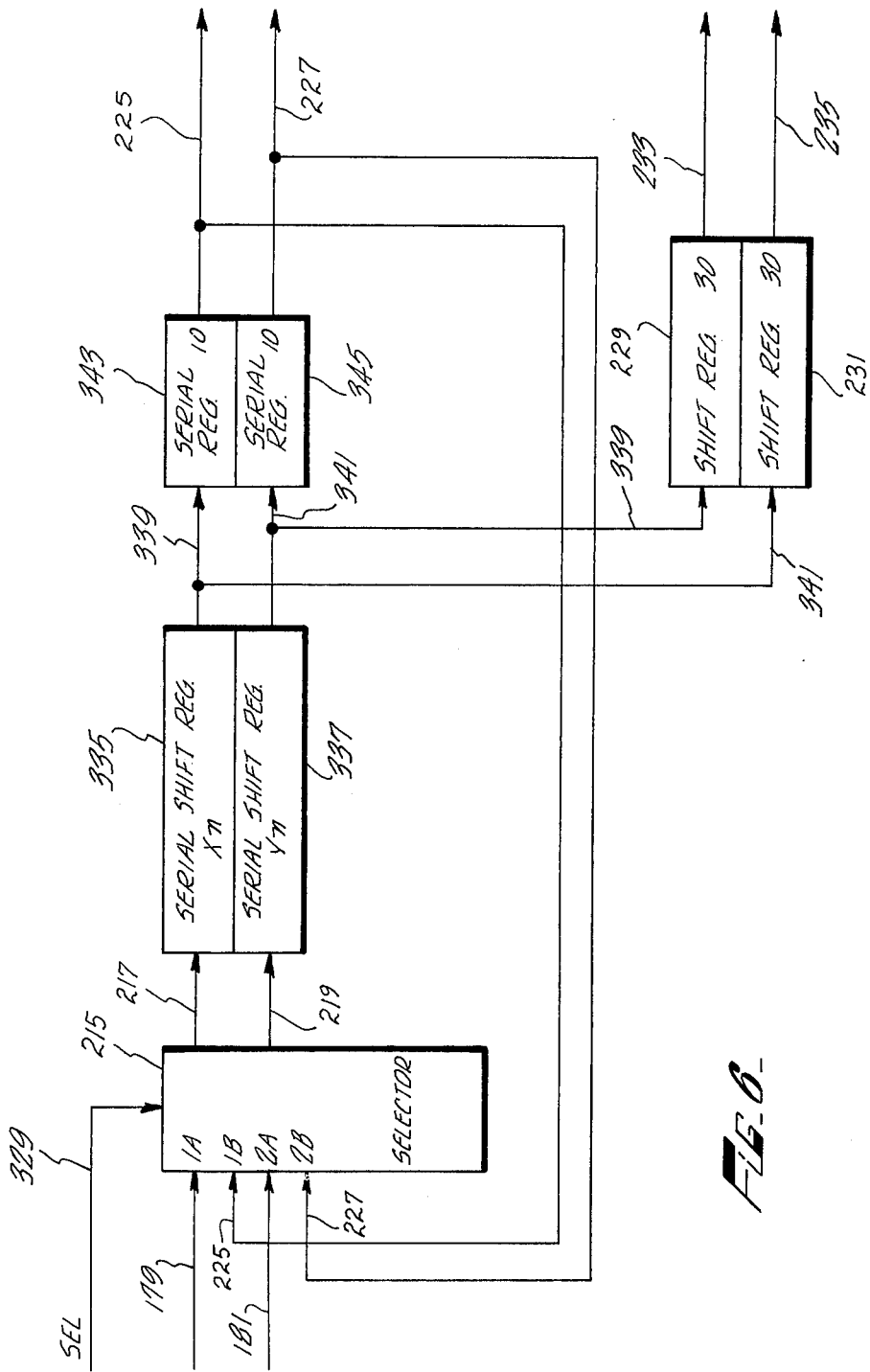
FIG. 6 is a block diagram illustration of the storage apparatus in the equalizer for the X and Y components of the received symbols.

Upon reception of the X and Y components of a received vector symbol on lines 179, 181 from the A to D converters 175 (FIG. 4), the timing generator 325 (FIG. 5 emits a select level on line 329 to selector 215 (FIG. 6). This select signal connects incoming lines 179, 181 through the outgoing lines 217, 219 for 10 clock times which is the preferred bit length for the X and Y components being received on lines 179, 181. These 10 bits per component are loaded in their respective storage registers 335, 337. Each register contains 250 bits or 25 X and Y component values. Assuming the X and Y component storage registers 335 and 337 to contain the X and Y component values of 25 previously received vector symbols, upon the next X and Y component set being loaded into the registers 335, 337 over lines 217, 219, a symbol is shifted out of registers 335, 337 over lines 339, 341 into 10-bit long registers 343, 345.

At this point the select signal on line 329 drops to its other value causing selector 327 to connect input lines 225, 227 to its output lines 217, 219 respectively. The next 10 clock times will therefore generate the X and Y components in registers 343, 345 on lines 225, 227. These lines are connected to multiplier-adders 235 and 237 (FIG. 5) and to the inputs 1B, 2B of selector 215. The X and Y components of this symbol are thereby loaded into the X and y storage registers 335, 337. Consequently, the contents of the 10-bit registers 343, 345 will contain the X and Y components of the next symbol. This sequence of shifting serial 10 bits end around will continue until next time select line 329 changes value to again select 1A, 2A input lines 179, 181. This occurs at the reception of the next symbol time.

Output lines 339, 341 of the storage registers 335, 337 also lead to 30 bit long storage registers 229, 231 respectively. As the 10 bit X and Y components are being shifted out of the registers 335, 337 into registers 343, 345 they are also being shifted into registers 229, 231. The output of storage registers 229, 231 are the X and Y components, On lines 233, 235 respectively, suppled to multiplier-adder logic 265, 267 (FIG. 5) which calculates the corrected X and Y components of the received symbol. The X and Y component words on lines 233, 235 are supplied to multiplier-adders 265, 267 respectively (FIG. 5) three word times after the same X and Y component words are supplied to multiplier-adders 235, 237 (FIG. 5) on lines 225, 227. This delay is utilized to compensate for the time required for multiplier-adders 235, 237 and the equalization constant generating logic 243, 245 (FIG. 5) to produce the equalization constants utilized by multiplier-adders 265, 267. Thus, at the time the calculated equalization constant from logic 243 (FIG. 5) is being received by multiplier-adders 265, 267, the X and Y components of a symbol are being transmitted on lines 233, 235 to multiplier-adders 265, 267.

GENERATION OF EQUALIZED X AND Y COMPONENTS

Figure 7:
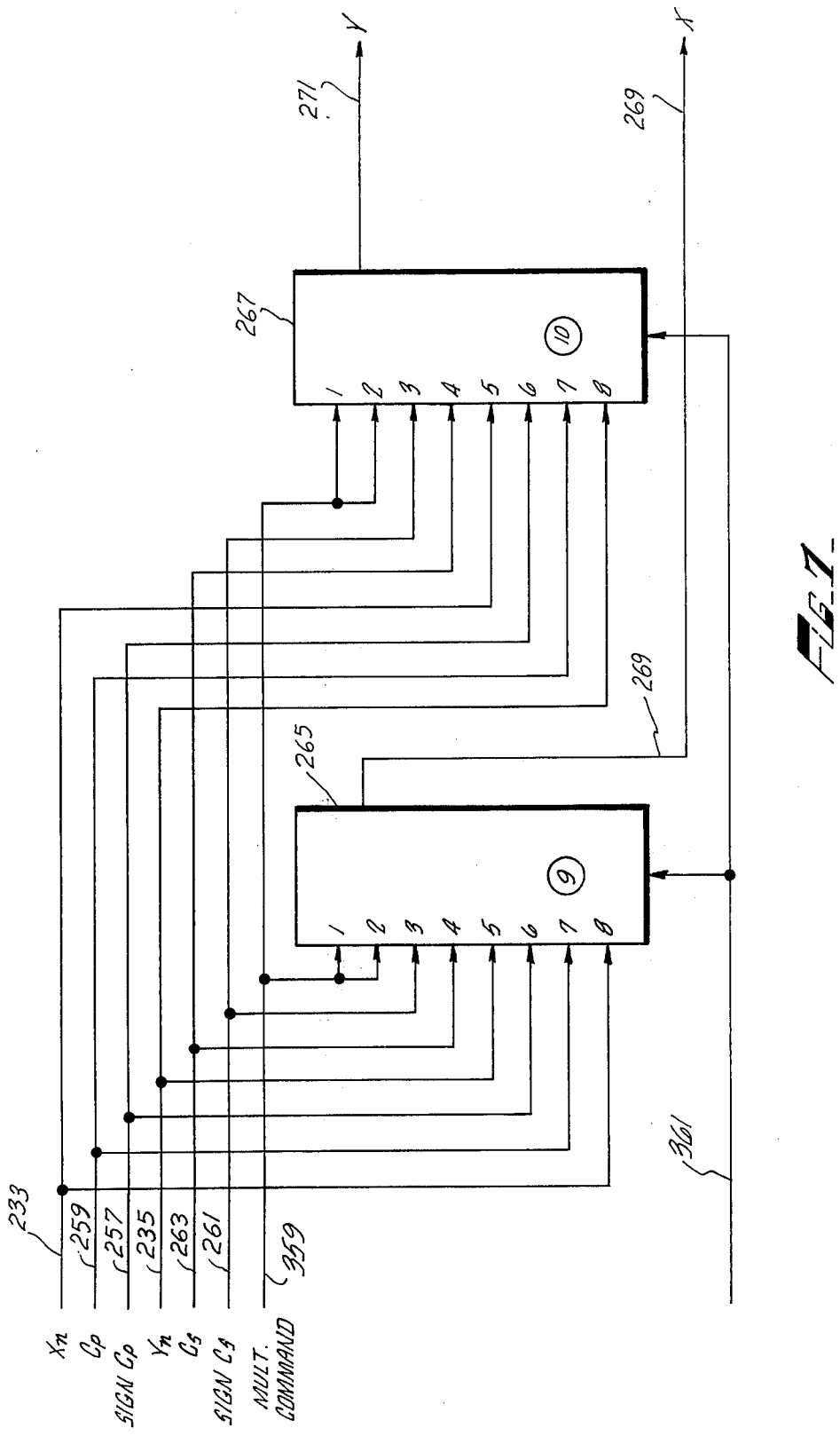
FIG. 7 is a block diagram illustration of the arithmetic logic in the equalizer that executes certain equations.

The corrected X and Y components of the received symbol are generated by the multiplier-adders 265, 267 (FIG. 7). The corrected X component generating multiplier-adder 265 executes the function:

$$CPX + CSY$$

The corrected Y component generating multiplier-adder 267 executes the function:
$$CPY - CSX$$

Multiplier-adder logic 265 and 267 operate in the accumulative multiply mode. Integrated logic circuits to perform this type of arithmetic are well known in the art, Texas Instruments being one chip manufacturer that supplies such logic circuitry.

The corrected X component from multiplier-adder 265 is outputted on line 269 upon a read out command being presented to multiplier-adder 265 on line 361 from the timing generator 325 (FIG. 5).

Multiplier-adder 265 operates in the following manner. Upon receiving the X and Y components of a symbol (assume the first symbol in time) from the shift registers 229 and 231 (FIG. 6) along with the magnitude and sign indications of the equalization constants CP and CS, multiplier-adder 265 performs the multiplication $CPX_N$ and $CSY_N$ and stores each result. Upon reception of the next $X_N$ and $Y_N$ component values, long with the next equalization constants CP and CS, the operation of $CPX_N$ and $CSY_N$ is again performed, with the additional step of the previous $CPX_N$ product being added to the presently generated $CPX_N$ product and the previously generated $CSY_N$ product being added to the presently generated $CSY_N$ product. This sequence continues for 25 times which equals the number of X and Y component values stored in the $X_N$, $Y_N$ component storage registers 335, 337 (FIG. 6). At the end of the 26th X, Y component sequence, a read-out command on line 361 causes the multiplier-adder logic 265 to read the accumulated $CPX_N$ product from its storage area and the accumulated $CSY_N$ product from its storage area into an adder which adds these two accumulated products, forming the corrected X component of the received symbol. This component is supplied to the X normalizer 273 (FIG. 5), in bit-serial form, over line 269.

The multiplier-adder 267 which generates the corrected Y component operates in the same manner as the corrected X component multiplier-adder, except for the final step. Upon receiving a read-out signal on line 361 the multiplier-adder 267 reads out the $CPY_N$ accumulated product and the $CSX_N$ accumulated product into a full adder that generates the difference between the $CPY_N$ and the $CSX_N$ accumulated products thereby producing the corrected Y component of the received symbol.

Both the multiplier-adder 265 for calculating the corrected X component and the multiplier-adder 267 for calculating the corrected Y component generate two products each time a multiply command is received on line 359 from the timing generator 325 (FIG. 5). The $X_N$ and $Y_N$ component values received on lines 233 and 235 are presented most significant bit first. Each component value is a 10-bit long word, the first bit representing the sign of the magnitude that follows. The equalization constants CP and CS received on line 259 and 263 are presented least significant bit first and in 2's complement form. The sign information for the equalization constants are supplied, in the case of CP, on line 257, and, in the case of CS, on line 261. The sign information for the CP and CS constants are presented to the multiplier-adders 265, 267 at the same time that the sign information of the $X_N$ and $Y_N$ components on lines 233 235 respectively is presented to the multiplier-adders 265, 267. This sign information is represented by 1 bit. After reception of the sign information, the magnitudes of the $X_N$ and $Y_N$ components and the CP and CS equalization constants are presented to the multiplier-adders. The first set of products is thereby generated. This sequence continues for 24 more cycles, the accumulated products being finally summed, as noted above, to product the corrected X and Y components on lines 365 and 371 respectively.

To summarize, the equalized X component and Y component values generated by the multiplier-adders 265 and 267 are the result of the accumulation of the equalization constants calculated for the previous 25 symbol vectors. The thus equalized X and Y component values representing the received symbol vector are sent on to their respective normalizer circuits 273, 275 (FIG. 5).

NORMALIZATION OF EQUALIZED X AND Y COMPONENTS

Figure 8:
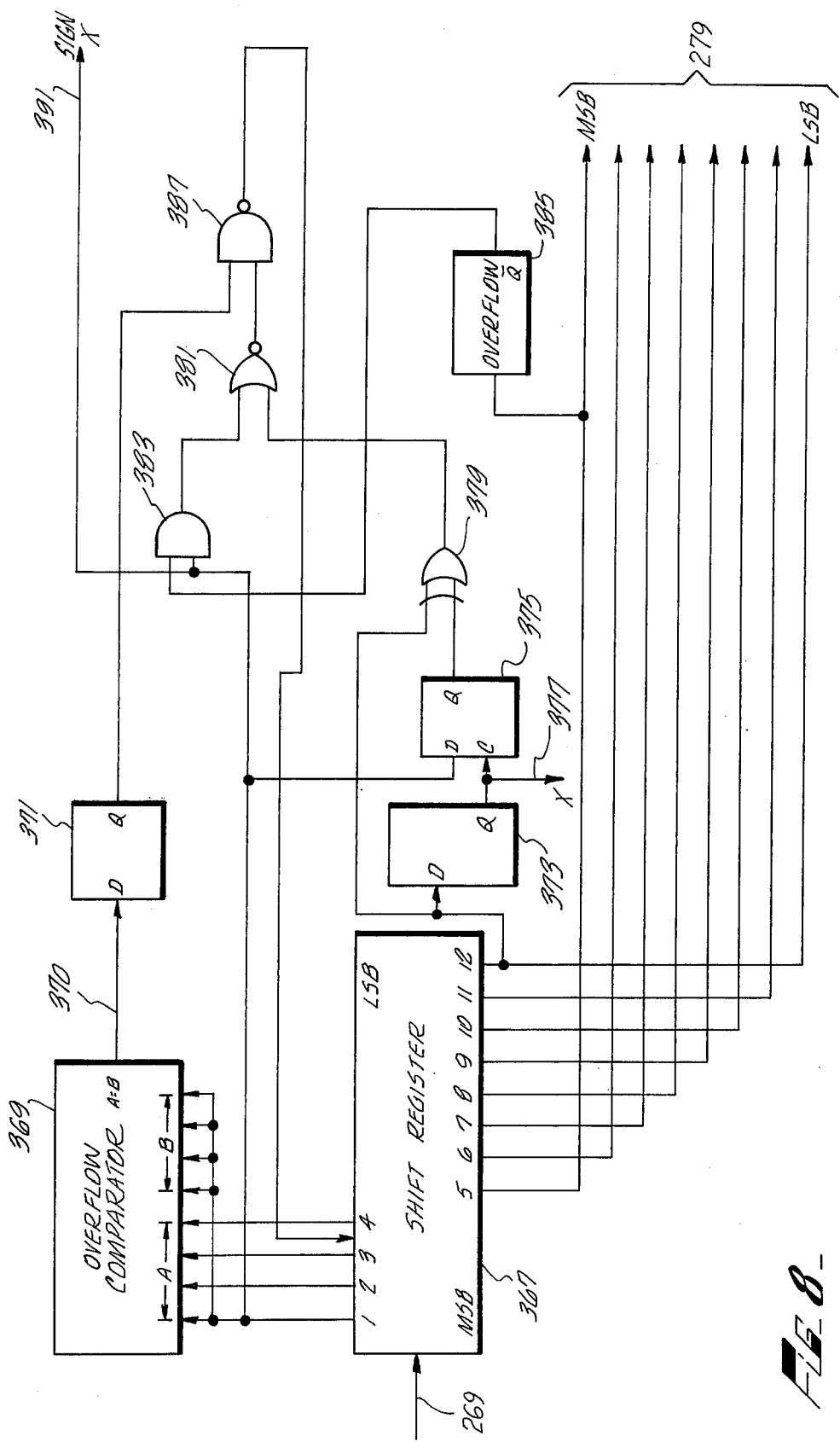
FIG. 8 is a block diagram and logic illustration of the normalizer apparatus utilized in the equalizer.
Figure 9:
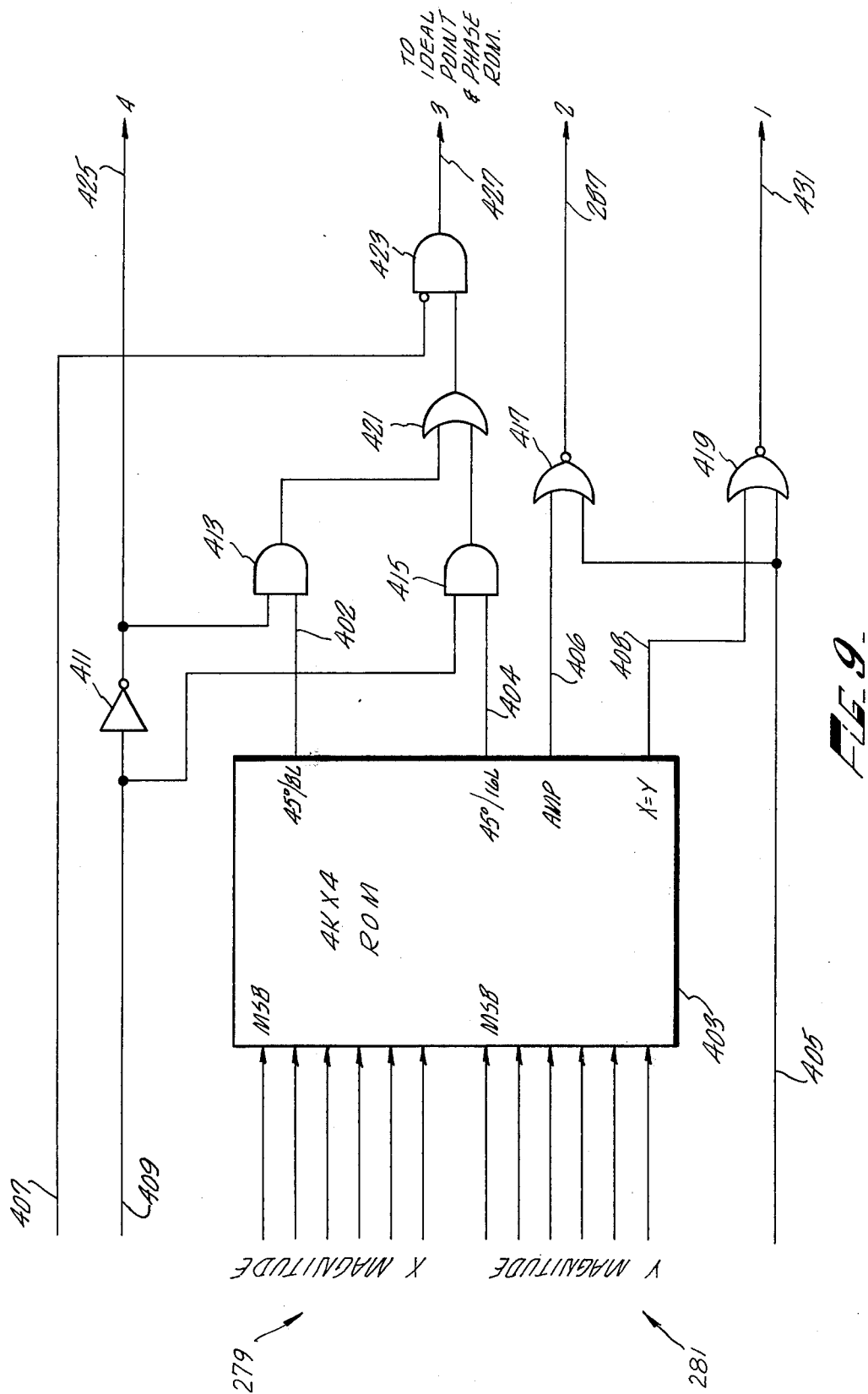
FIG. 9 is a block diagram and logic illustration of the location memory apparatus that is utilized in the equalizer.

The normalizer circuit for the X component value is illustrated in FIG. 8. The normalizer circuit for the corrected Y component value is identical in structure and therefore will not be illustrated. Generally, it can be said that the normalizer circuit consists of three logic functions, a storage register for storing the normalized X component, an overflow detector, and a 2's complement converter. The corrected X component of the received symbol vector is clocked into the serial shift register 367, least significant bit first over line 269. This X component value is in 2's complement form and is 12 bits long. As soon as this 12 bit number is completely shifted in, an overflow comparator 369 checks to see if there has been an overflow.

An overflow condition is defined as the four most significant bits of the number in the serial shift register 367 not being alike. Overflow comparator 269, which can be any of the well-known 4 bit binary comparators, generates a binary high on line 370 when the four most significant bits of the X component value shifted into register 367, as applied to the A inputs of the comparator 369, are identical to the four B inputs of the comparator 369. The signals supplied to the B inputs are, of course, the binary value of the most significant bit.

The output on line 370 of comparator 369 is presented to a D-type flip-flop 371 which provides an enable signal to a 2 input NAND gate 387. The output of the NAND gate 387 is fed back to the number 4 input of the serial shift register 367. Another overflow detector flip-flop 385 monitors for the presence of all binary zeros in the eight least significant bits of the X component number in shift register 367. If the eight least significant bits in the register 367 are zeros then the $\overline{Q}$ output of flip-flop 385 will be a binary 1. The output of flip-flop 385 is connected to AND gate 383. The other input to AND gate 383 is the sign bit of the X component shifted into the register 367. If the sign bit is a binary 1 the number in the shift register 367 is negative.

If both inputs to AND gate 383 are binary 1, the output becomes the binary 1. This output is supplied to a NOR gate 381. If any of the eight least significant bits of the 12 bit X component is a binary 1, the $\overline{Q}$ output of flip-flop 385 will be a binary zero, disabling AND gate 383.

Assuming that both overflow comparators 369 and 385 detect a lack of overflow, AND gate 383 will be generating a binary zero causing NOR gate 381 to be enabled, and the Q output of D flip-flop 371 will be a binary 1, enabling NAND gate 387.

With a no-overflow condition, the X component value shifted into register 368 will be converted from a 2+s complement negative number into a pure magnitude and sign indication by D-type flip-flop 373, D-type flip-flop 375 and Exclusive OR gate 379. This 2's complement converter circuit is enabled by a binary 1 at D input of flip-flop 375. This D input is connected to the sign bit of the X component value that was shifted into register 368. If this sign bit is positive the D input to flip-flop 375 is a binary 0, causing the Q output to be a binary zero. With the Q output of flip-flop 375, being a binary 0, the serial data from shift register 368 leaving the register at output 12 will be shifted through Exclusive OR gate 379, NOR gate 381 and NAND gate 387 back to the number 4 serial loading input of shift register 367. The 2's complement contents of bits 5 through 12 in the shift register 368 are thereby converted into an 8 bit pure magnitude indication. The sign for this magnitude is presented over line 391. The magnitude of the X component now residing in slots 5 to 12 of register 367 may be removed, in parallel, from the shift register.

If the X component number that was shifted into register 368 was negative, the sign bit would be a binary 1. The bits are shifted out of register 367 through Exclusive OR gate 379, NOR gate 381, and NAND gate 387 back into shift register 368. The negative 2's complement contents of bits 5 through 12 in the shift register 367 are thereby converted into an 8 bit pure magnitude number.

In summary, the normalizer circuit takes either a negative or a positive 2's complement number and converts it into a binary magnitude indication and a sign bit. Upon the magnitude indication residing in register 367 the 8 bit magnitude indication is removed from register 367 over parallel lines 279. The Y component normalizer likewise functions to generate an 8 bit magnitude indication of the equalized Y component and a 1 bit sign indication.

PHASE PLANE LOCATION ROM

The six most significant bits (MSB) of both the normalized X and Y magnitudes are supplied to a 4K × 4 read only memory (ROM), 403. As a consequence of the X component magnitude and Y component magnitude addressing the ROM 403, various signals are generated on lines 402, 404, 406 and 408 indicating the location of the received vector symbol in one of the decoding areas in the first quadrant of the phase plane. The signal on the X = Y output line 408 is a binary 1 if the X magnitude is greater than the Y magnitude, and a binary 0 if the X magnitude is less than the Y magnitude. The signal on the amplitude output line 406 is a binary 1 if it is a full-scale number and a binary zero if the X and Y magnitudes represent half-scale numbers. In optimized eight-phase, 2 amplitude operation, the signal on 45°/16L line 404 is a binary 1 if the X and Y magnitudes indicate that the received symbol is at a 45° phase angle. If this is not the case, the signal on 45° line 404 is a binary zero. This is also true for the modified eight phase case.

During the fast equalize mode that functions only during start up, binary 1's are presented on lines 407 and 405 from the timing generator (FIG. 5). This causes NOR gates 417 and 419 and AND gate 423 to be disabled, thereby presenting binary zeros on lines 427, 287, and 431.

If four phase modulation is being utilized, as shown in FIG. 1, the signal on line 407 is binary 1 while the signal on line 405 is a binary 0. The signal on line 409 from the timing generator (FIG. 5) will also be a binary 0. The signal is inverted by inverter 411. The signal level on line 407, a binary 1, will disable AND gate 423.

If the mode of operation is to be modified 8 phase, the signal level on line 407 will be a binary 0, thereby enabling AND gate 423 and passing the output of OR gate 421 to output line 427. Because the signal level on line 405 is a binary 0, the amplitude signal on line 406 is passed through NOR gate 417 as a negated signal on line 287. AND gate 423 will pass either the 45° indication signal output for modified eight phase on line 402 or the 45° indication for optimized, eight-phase two level on line 404. Whether a signal level is generated on line 402 or 404 of the 4K × 4 ROM is determined by the magnitudes of the X and Y components of the received symbol addressing the ROM.

The exact binary contents of the 4K × 4 ROM is seen as well within the purview of a person of ordinary skill in the art when considering the phase modulation techniques illustrated in FIGS. 1, 2 and 3, and will not be further discussed herein.

IDEAL POINT AND PHASE ROM AND ERROR GENERATION

Figure 10:
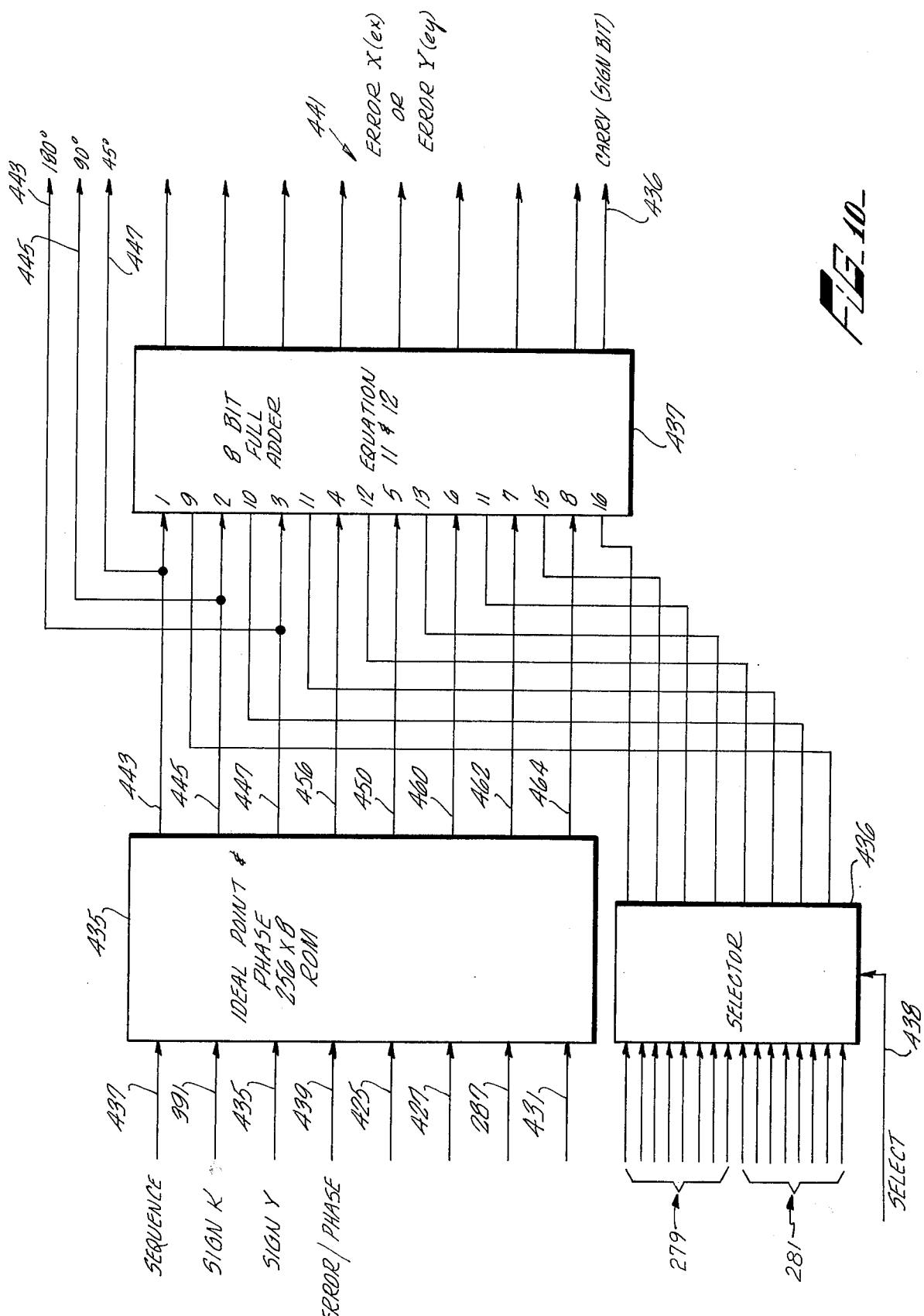
FIG. 10 is a block diagram and logic illustration of the ideal point & phase memory and the arithmetic apparatus that is utilized in the equalizer.

The output lines 425, 427, 287, 431 from the selecting logic and the read only memory 403 are connected to an ideal point and phase read only memory (ROM) 435 (FIG. 10). As was noted earlier, during the fast equalize mode, the signal levels on lines 427, 287 and 431 are binary 0 indicating that the angle is not 45°, the amplitude is full scale and X magnitude is always larger than the Y magnitude. This is the condition for a two phase case where only ±X values are being looked for. The signal level on line 425, as noted earlier, indicates whether four phase, eight phase or 16 level is being utilized. The ideal point and phase ROM is broken up into two memory fields. One field contains all the ideal component values of the X and Y components for the three modulation schemes. The other field contains all the ideal angles for the three phase modulation schemes. The binary signal level on line 439 determines whether the ideal X and Y component field or the ideal phase field is to be addressed by the binary information received on the other input lines. The binary information on line 437 from timing generator 325 (FIG. 5) determines whether the ideal X component or the ideal Y component is to be read from the component field of the memory 435. During the time that the X and Y component field of the memory 435 is being addressed, the binary signal levels on lines 391 and 435 are of no consequence. These signal levels are utilized only when the ideal phase field of the memory is being addressed, as determined by the binary signal level on control line 439.

As determined by the sequence control line 437, the first information to be read out of the ROM 435 is the ideal X component. This ideal X component is read out of the memory on parallel lines 443, 445, 447, 456, 458, 460, 462, and 464. The form of this ideal point X component is a negative 2's complement binary number. It is submitted to an 8 bit full adder 437 at its 1 through 8 inputs. At the same time, selector 436 is directed by the select signal on line 438 from timing generator 325 (FIG. 5) to pass the magnitude of the received X component on lines 397 to the 9 through 16 inputs of the full adder 437. It should be remembered that the particular component value read out from the memory 435 is dependent on binary information presented to the memory at its 1 through 4 inputs upon the correct signals being presented at the sequence input line 437 and the error or phase input line 439.

Upon the reception of the negative 2's complement of the ideal X component and the magnitude of the equalized received X component at its 1 through 16 inputs, the 8 bit full adder 437 performs the following equation:

$$X_{NT} - X_D{}^{NT} = e_X{}^{NT}$$

This results in a 2's complement number representing the difference between the equalized magnitude of the received X component and its ideal X component. This difference appears on lines 441 as an error X ($e_X$) value. The signal on line 436 is a carry bit which is treated as the sign bit for the error X value.

Upon this calculation being completed, the logic level on sequence line 437 will change dictating the processing of the Y component value. The same information on inputs 1 through 4 will therefore cause a 2's complement of the ideal y component value to appear on the output lines 443, 445, 447, 456, 458, 460 462, 464 of the ideal ROM 435. At this time, the select signal on line 438 will direct selector 436 to pass the Y magnitude on lines 399 to the 9 inputs of the 8 bit full adder 437. The adder 437 thereby has the negative 2's complement of the ideal Y component and the magnitude of the received Y component. In response to this information, it performs the following equation:

$$Y_{NT} - Y_D{}^{NT} = e_Y{}^{NT}$$

The result of a 2's complement of the difference between the received inputs which results in an error Y ($e_Y$) indication on lines 441. Again the binary information on line 436 is taken as the sign bit.

Prior to the calculation of the error Y values the error X values on line 441 are shifted into a parallel in/serial out register 475 (FIG. 12), as will be hereinafter explained. Upon the calculation of the error Y values by adder 437 and their appearance on lines 441 these values are shifted and stored in parallel in/serial out register 479 (FIG. 12), as will be more fully hereinafter explained.

The next information that is retrieved from the ideal point of phase ROM 435 is the ideal phase angle that corresponds with the ideal X and Y component values read from the ROM 435. The binary signal level on input line 439 directs that the second field of the memory 435 should be addressed, thereby causing the binary information presented on the input terminals 1 through 4 of the memory to address the second field of the memory 435. At this time, the sign X component and sign Y component values on lines 391 and 435 respectively, are also utilized. In response to these input signals to the ROM 435, the phase information is read out on lines 443, 445 and 447 of the memory. The combination of three binary signal levels, one of each of these three lines indicate the value of the ideal phase angle corresponding to the ideal binary X and Y components just previously read out from the memory 435.

Figure 11:
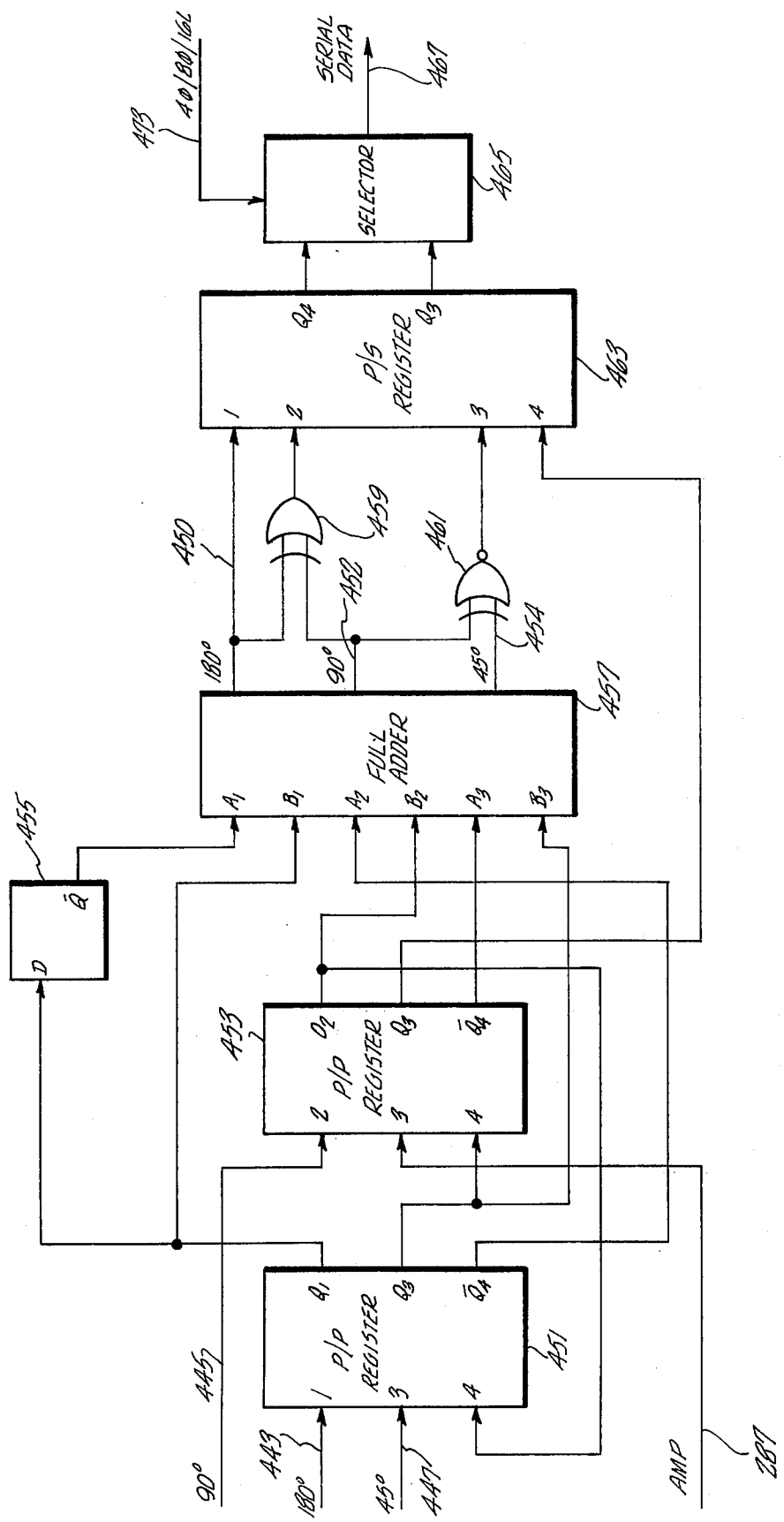
FIG. 11 is a block diagram and logic illustration of the Δ phase calculating apparatus and Δ phase to binary data converter apparatus used in the equalizer.

Any convenient code can be utilized to indicate the phase angles in 45° increments. Line 443 carries a 180° indication. Line 445 carries a 90° indication and line 447 carries a 45° indication. This phase information on lines 443, 445, 447 is transmitted to a delta phase calculator and grey-code converter shown in FIG. 11.

DELTA PHASE CALCULATION AND BINARY INFORMATION RETRIEVAL

The ideal phase information on lines 445, 443, and 447 are presented to two parallel-in/parallel-out storage registers 451 and 453 which contain the previously retrieved ideal phase indication. An amplitude indicating signal on line 287 from the 4K × 4 location ROM 403 is presented to register 453. The ideal phase indication from the previously received symbol is read out of the $Q_1$ output of register 451 to the D input of flip-flop 455, the $Q_3$ output of register 451 to the number 4 input of register 453 and the $Q_2$ output of register 453 to the number 4 input of register 451. The D-type flip-flop 455 complements the received binary indication of this previously received phase symbol and supplies it to the $A_1$ input of a full adder 457. Register 451 complements the binary indication received at its number 4 input by reading it out of the $\overline{Q_4}$ output into the $A_2$ input of full adder 457. Register 453 complements the binary information received at its number 4 input by reading it out of its $\overline{Q_4}$ output into the $A_3$ input of full adder 457. The presently retrieved phase indication information received on lines 445, 443, and 447 is read out of the $Q_1$ output of register 451 directly into the $B_1$ input of the full adder 457, out of the $Q_3$ output of register 451 directly into the $B_3$ input of the full adder 457, and out of the $Q_2$ output of register 453 into the $B_2$ input of full adder 457.

The full adder effectively takes the difference between the previously retrieved phase indication stored in registers 451 and 453 and the recently recieved phase information on lines 445, 443, and 447 because the previously received stored information has been converted to a 2's complement. This difference indication appears on lines 450, 452, and 454 of full adder 457 and is converted by Exclusive OR gate 459 and Exclusive NOR gate 461 into a grey-code indication of the phase difference between the previously received and the presently received phase angle indication. This information is supplied to a parallel/serial register 463 that additionally receives the amplitude indicating signal from the $Q_3$ output of register 453.

Register 463 is a parallel input/serial output register that clocks the data contained therein out serially. A selector 465 is connected to the $Q_4$ and $Q_3$ serial output terminal of the register 463. A select signal on line 473 directs selector 465 to connect either the $Q_4$ output or the $Q_3$ output to output serial data line 467. When two-level eight-phase modulation is utilized, the signal on line 473 selects the $Q_4$ output of the register 463 thereby generating a 4 bit representation of the received symbol, three bits representing the phase angle and one bit representing the amplitude. If 4-phase or modified 8-phase is being utilized as the modulation technique, the signal on line 473 directs the selector 465 to connect the $Q_3$ output to the serial data line 467 thereby selecting the three phase angle bits without the amplitude bit. The serial data on line 467 is the grey-coded indication of the received vector symbol that is supplied to a utilization device.

$\Delta KP$ and $\Delta KS$ GENERATION

Figure 12:
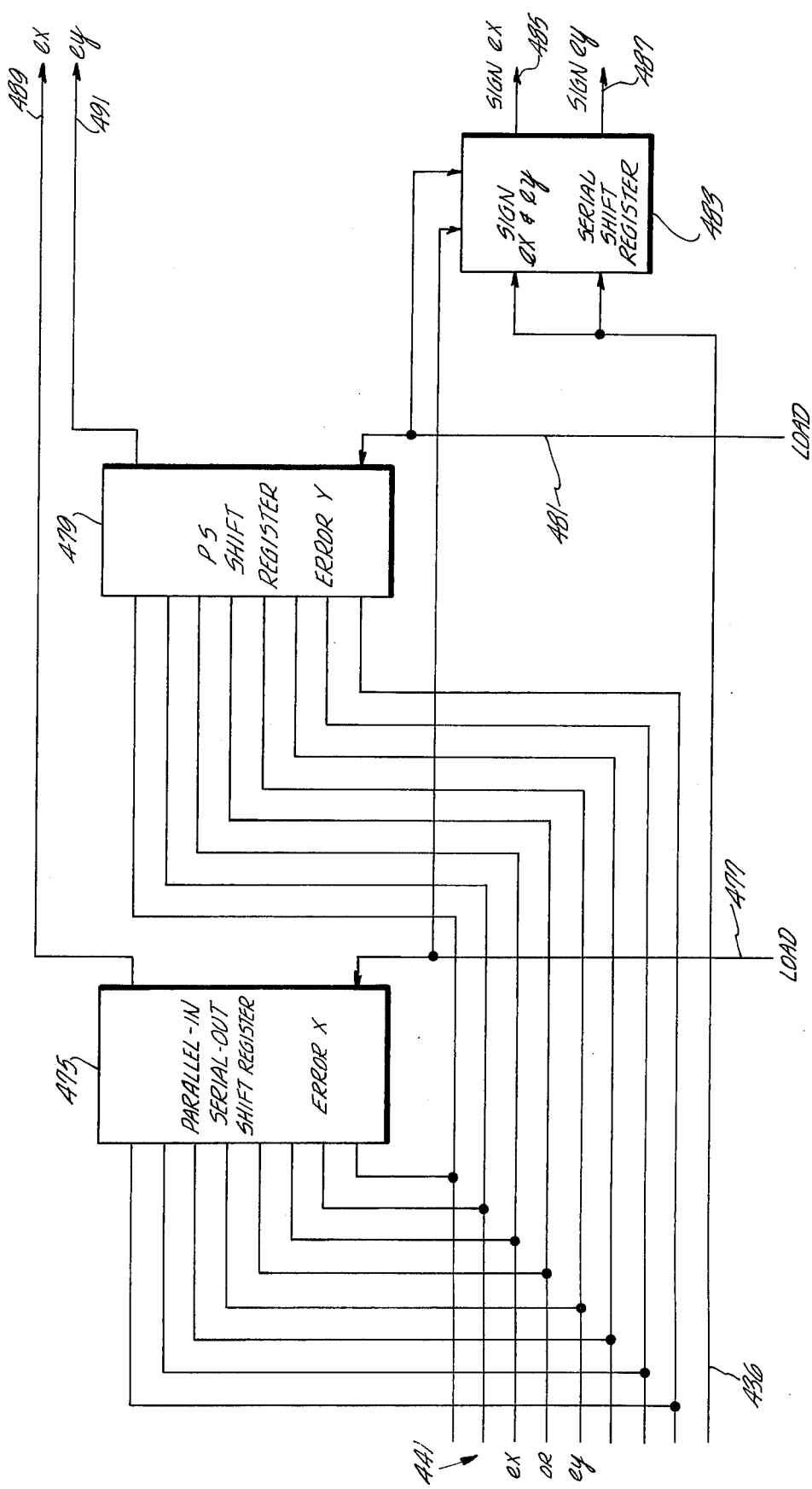
FIG. 12 is a block diagram illustration of the error X and error Y storage facility utilized in the equalizer of the present invention.
Figure 13:
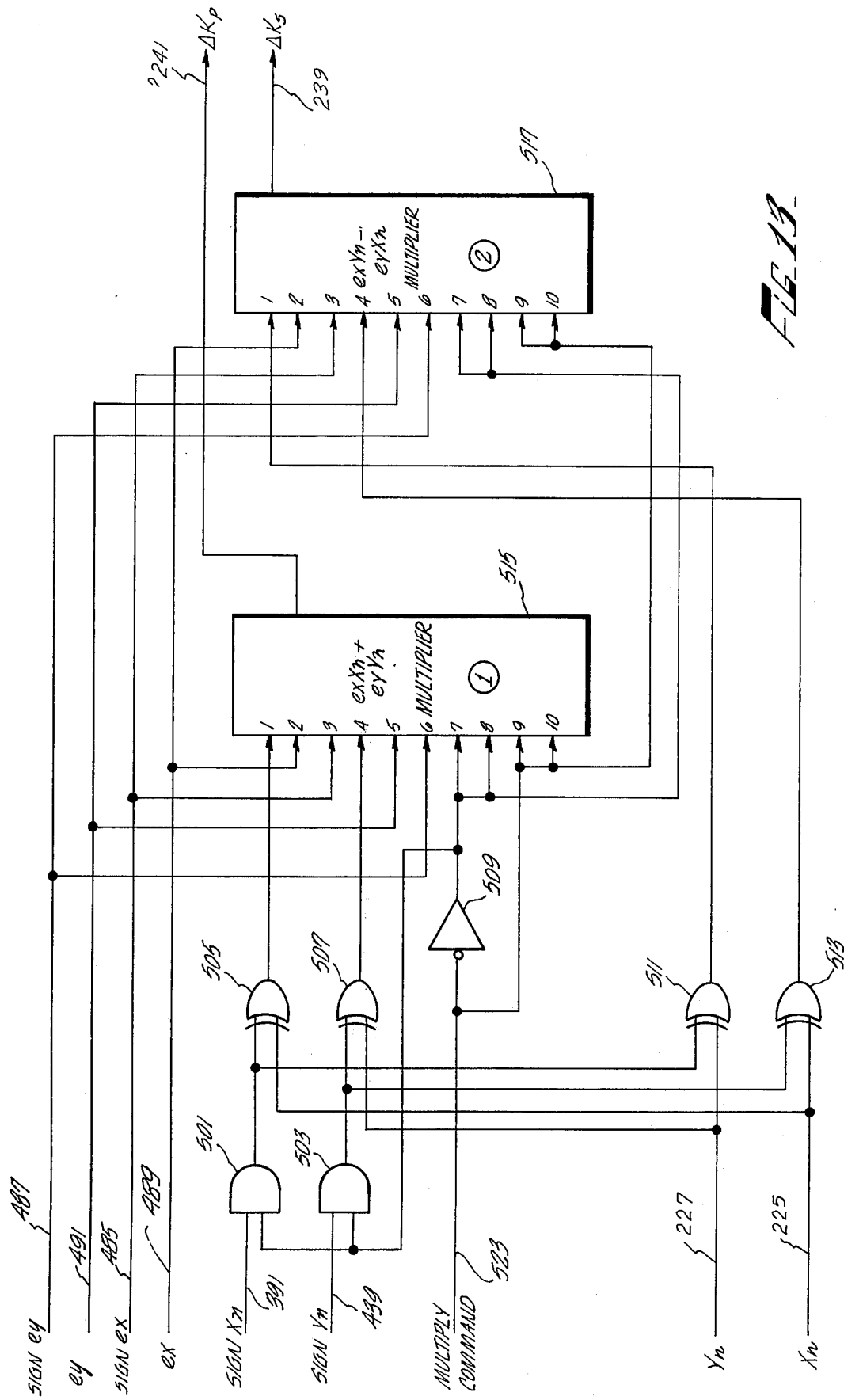
FIG. 13 is a block diagram and logic illustration of arithmetic apparatus in the equalizer utilized to calculate certain equations.

Referring now to FIG. 12, the storage registers for receiving the $e_X$ and $e_Y$ binary values calculated by the 8 bit full adder 437 (FIG. 10) are illustrated. At the time that the $e_X$ information is being received on lines 441 the sign indication for $e_X$ is also being received on line 436. A load command signal is presented to parallel-in/serial-out shift register 475 on line 477. As a consequence, the $e_X$ information is laded into register 475, and the sign indication for $e_X$ is loaded into register 483. Subsequent to the storage of the $e_X$ information in the register 475, as explained in the connection with the operation of 8 bit full adder 437 (FIG. 10), the error Y information appears on line 441 along with the sign information for $e_Y$ on line 436. This information, in response to a load command on line 481 is loaded into the parallel-to-serial shift register 479. The sign bit is loaded into register 483. The $e_X$ information is clocked out of register 475 over output line 489 in bit serial fashion upon command. The $e_Y$ information is clocked out of register 479 over output line 491, also in a bit serial fashion, upon command. The $e_X$ sign indication and $e_Y$ sign indication appears on output lines 485 and 487.

This information is supplied to multiplier-adders 515 and 517, upon the reception of a new vector symbol by the equalizer to calculate $\Delta KP$ and $\Delta KS$ values for the previously received vector symbols. Multiplier-adder 515 executes the function:

$$e_X X + e_Y Y = \Delta KP$$

for each X and Y component presented to it.

The sign of $e_Y$ on line 487 is presented to the number 6 input of multiplier-adder 515 and the number 6 input of multiplier-adder 517. The $e_Y$ value on line 491 is represented serially in 2's complement form over line 491 to the number 5 input of multiplier-adder 515 and number 5 input of multiplier-adder 517. The sign of $e_X$ on line 485 is presented to the number 3 input of multiplier-adder 515 and the number 3 input of multiplier-adder 517. The $e_X$ binary value is presented serially on line 489 in 2's complement from to the number 2 input of multiplier-adder 515 and the number 2 input of multiplier-adder 517.

The magnitude values of $e_X$ and $e_Y$ appearing on lines 491 and 489 in its 2's complement form have the correct sign associated with them on lines 487 and 485 respectively, as long as the received vector symbol falls in the first quadrant. That is, the X and Y components are both positive. In order to get the correct $e_Y$ and $e_X$ sign indication to the multiplier-adders 515 and 517 the signs of the X and Y components received from the serial shift register 343 (FIG. 6) are modified to compensate for the occurrence of the received vector symbol in the second, third or fourth quadrants. The X and Y information received on lines 225 and 227, respectively carry both sign and magnitude information. The sign information on these lines is modified according to the sign information of the corrected X and Y components from the respective X and Y normalizer circuits. The sign information for the X component for example is received from the normalizer circuit of FIG. 8 over line 391. The sign infomation for the Y component is received over line 435 from the Y normalizer circuit (not shown).

The sign of the component Y coming in one line 227 is supplied to the number 4 input of the multiplier-adder 515 and the number 1 input of the multiplier-adder 517. Depending upon the value of the sign information received on lines 435 and 391 from the Y and X normalizers respectively, AND gates 503 and 501 are enabled by the output of inverter 509. Inverter 509 responds to a multiply command on line 523, thereby passing the sign of Y information on line 435 to one input of Exclusive OR gate 507 and the sign of X to one input of Exclusive OR gate 511. The other input to Exclusive OR gate 507 is the sign of Y information on line 349. The other input to Exclusive OR gate 511 is the sign of Y information on line 349. The output of Exclusive OR gate 507 is the modified sign of Y information supplied to multiplier-adder 515. Since multiplier-adder 517 is calculating the function $$e_X Y - e_Y X = \Delta KS$$

the sign of Y information for multiplier-adder 517 is modified according to the sign information from the X component normalizer of FIG. 8. Thus, upon a multiply command appearing on line 523, inverter 509 enables AND gate 501, passing this sign of X information to Exclusive OR gate 511. The other input to Exclusive OR gate 511 is the sign of Y information on line 349. The output of Exclusive OR gate 511 is supplied to input 1 of multiplier-adder 517.

The sign of X information received on line 227 is likewise modified according to the sign of X and sign of Y information on lines 391 and 435. The modified sign information from Exclusive OR gate 513 for X is supplied to the number 4 input of multiplier-adder 517. The modified sign information for X is supplied by Exclusive OR gate 505 to the number 1 input of multiplier-adder 515.

After receiving the corrected sign indications, for the error X, error Y, and X and Y information, the multiplier-adders 515, 517 receive the magnitude of $e_X$ and $e_Y$ information least significant bit first. The top six most significant bits of the stored 8 bit $e_X$ and $e_Y$ values are used. The X and Y values go into the multiplier-adders 515 and 517 at this time, most significant bit first. The result of the presentation of date in this format to the multiplier-adders 515 and 517 is that the $\Delta KP$ value appears bit serially on line 241 and the $\Delta KS$ value appears bit serially on line 239. These values are in 2's complement form. Before they can be utilized there 2's complement values must be converted to negative numbers.

EXECUTIVE OF EQUATIONS 3 AND 5

The $\Delta K$ is converted into a negative number by a 2's complement conversion performed by inverter 531 in FIG. 14. FIG. 14 illustrates the logic circuitry utilized for generating equations 3 and 5 of the equalizer algorithm. The logic circuitry for generating equations 4 and 6 upon reception of $\Delta KS$ is identical and will not be shown separately herein.

The $\Delta KP$ information is received on line 241 and supplied to inverter 531. It is clocked out of the inverter 531 by clock pulses received on line 216 from the timing generator (FIG. 5). The received $\Delta KP$ value on line 519 is complemented by inverter 531 and supplied to a first input of serial 533. The second input of the adder 533 comes from a KP storage register 563 which contains 25, 10 bit long words, that are the 25 previously generated KP values for the 25 previously received symbols. These values are in 2's complement form. As a $\Delta KP$ value is being received by serial adder 533 at its number 1 input, a 10 bit word is clocked out of shift register 563 into the number 2 input of serial adder 533. The $\Delta KP$ value received at the number 1 input of serial adder 533 is being received least significant bit first. D-type flip-flop 537 receives the overflow of the serial adder 533 on line 535 and takes into account any carries generated by the addition operation. The sum is supplied over line 539 to shift register 541 and is stored therein as a 10 bit word in 2's complement form. To execute equation 5 the contents of register 541 is divided by some appropriate power of 2.

Assuming that the divisor for the binary value stored in shift register 541 is to the second power, in other words 4, the divide by 4 is executed under the control of the selector 561. If the division is to be by 4, the least significant bits are shifted out of the register 541 through the A input of selector 561 into KP storage 563 over line 562. At the third clock time the select signal on line 529 from the timing generator (FIG. 5) which determines the division rate switches to another level selecting the B input of selector 561 to be connected to the line 562 leading into register 563. The B input of selector 561 comes from the Q output of D-type flip-flop 559 which stores the sign of the 2's complement number in register 541. For the remainder of the 10 bit word, this sign bit is shifted into register 563. As a result, the remainder of the binary division is in shift register 563 while the quotient $\Delta CP$ is stored in register 541.

A selector 555 responds to a select signal on line 551 from timing generator 325 (FIG. 5) to cause either the five most significant bits or the eight most significant bits of the $\Delta CP$ magnitude in register 541 to be shifted out over line 557. Line 553 carries the seven most significant bits of the $\Delta CP$ value in register 541.

CALCULATION OF THE EQUALIZATION CONSTANT

The logic circuit of FIG. 15 illustrates the implementation of equation 7 for the calculation of a new equalization constant CP. It should be understood that identical circuitry is utilized for the calculation of the equalization constant CS. A selector 571 receives the enable signal on line 549, the $\Delta CP$ value on line 553 that represents the seven most significant bits of the 10 bit $\Delta CP$ word stored in register 541, a sign $\Delta CP$ value on line 565 and a $\Delta Cp$ value on line 557 from selector 555 (FIG. 14) that will be either a five most significant bit or eight most significant bit $\Delta CP$ value. Two select inputs $S_1$ and $S_2$ of selector 571 are received on line 567 and 569 respectively. They determine which input lines 1, 2, 3 or 4 are selected for transmission to a serial adder 575. The select signals on lines 567 and 569 determines which magnitude portion of the 2's complement number of $\Delta CP$ from register 541 is shifted through the selector 571. Upon this magnitude indication being shifted through the selector 571 to serial adder 575 the sign of $\Delta CP$ is shifted to the serial adder 575.

Assuming fine mode operation, the signals on line 567 and 569 will enable the $\Delta CP$ value on line 557 to be shifted through and thereupon enable the sign $\Delta CP$ value to be shifted through to complete a 10 bit word to the serial adder 575. An overflow detector 573 is utilized to prevent registers 579 and 585 from overflowing due to a very large $\Delta CP$ being added to a very large CP value. The incoming $\Delta CP$ is added to the CP from the previous symbol time least significant bit first by adder 575. The output of the summation is stored in register 579. Register 585 contains the 25 CP values for the 25 previously received vector symbols.

The 2's complement CP value leaving serial adder 575 is stored in shift register 579. The D-type flip-flop 577 facilitates the handling of the carry generated by serial adder 575. Upon the calculation of the first on the 25 new CP values, it is shifted out of the $Q_{12}$ output of register 579 over line 259 to multiplier-adders 265 and 267 (FIG. 7). The sign for this new CP value exits the $Q_{12}$ output of register 579 and is supplied to the above mentioned multiplier-adders over line 257. This sign value is supplied to the multiplier-adders prior to the magnitude of CP on line 259 being supplied thereto. The magnitude of the newly calculated CP value is shifted into register 585 thereby continually updated the storage of CP values in register 585 to the latest 25 CP values.

AND gate 583, besides cycling the CP values from register 585 back around to the input of serial adder 575, facilitates the loading of a preset CP value into register 579 upon initial start when so enabled by a signal on line 581 from the timing generator 325 (FIG. 5). This preset CP value is supplied to the multiplier-adders 265, 267 (FIG. 7) to enable them to execute equation 9 and 10 of the equalization algorithm.

The symbol quality indication circuit in FIG. 16 simply presents either the generated $e_X$ signal on line 311 or the $e_Y$ signal on line 315 to a display by way of line 605. These error signals represent received symbol quality. If the signal on line 291 (X = Y output of location ROM 285) in a binary 1 indicating that the X component of the received symbol is larger than the Y component, the $e_X$ signal on line 311 is passed by selector 601 to the register 603. Conversely, if the signal on line 291 is a binary 0 then the $e_Y$ signal on line 315 is passed by selector 601 to the register 603. The AND gate 597 and inverter 595 generate a loading signal to register 603, on line 599 whenever the timing signal on line 593 is a binary 1 and the signal on line 289 is a binary 0, indicating that the received symbol is not at 45°.

In summary, a method and apparatus that provides fast correction for envelope delay and amplitude distortion of a data signal has been disclosed. The equalizer can operate with a variety of phase modulation techniques in order to attain switch selectable speeds.

It should be understood, of course, that the foregoing disclosure relates only to a preferred embodiment of the invention and that numerous modifications may be made therein without departing from the spirit and the scope of the invention as set forth in the appended claims.

What is claimed is:

1. A method for correcting the envelope delay and amplitude distortion characteristic of voice-band transmission channels on signals propagated therethrough, comprising:
converting a received symbol into its corresponding binary X and binary Y components;
equalizing the binary X and binary Y components of the received symbol according to previously defined equalization constants;
generating the difference between the equalized components of said received symbol and the ideal binary X and binary Y components of said symbol; and
utilizing said difference and the binary X and binary Y components of the received symbol to modify the equalization constants.

2. The method of claim 1 wherein said generating step includes:
locating the area of the phase plane in which the received symbol belongs by use of the equalized binary X and binary Y components;
generating the ideal binary X and ideal binary Y component in the area of the phase plane occupied by the received symbol; and
subtracting the ideal X component and ideal Y component from the equalized X component and Y component, respectively, to obtain an error X and error Y value.

3. The method of claim 1 wherein said utilizing step includes:
generating a change of correction factor by using said difference and the binary X and binary Y components of said received symbol;
generating a new correction constant by use of the newly generated change of correction factor;
generating a change of equalization factor by use of the new correction constant; and
modifying the equalizing constants according to the newly generated change of equalization factor.

4. The method of claim 1 further comprising:
generating the ideal phase angle of the received symbol in response to the equalized binary X and binary Y components of the received symbol;
subtracting said generated ideal phase angle from the ideal phase angle generated for the previously received symbol to get a phase change; and
converting the phase change to digital data.

5. A method for correcting for the phase and amplitude distortion characteristic of voice-band transmission channels on double-sideband modulated carrier signals, comprising:
converting a received symbol into its corresponding binary X and binary Y components;
storing the binary X and binary Y components of the received symbol with a plurality of binary X and binary Y components of previously received symbols;
equalizing the stored binary X and binary Y components of a symbol according to previously calculated equalization constants;
generating an error X and error Y factor by taking the difference between the equalized binary X and binary Y components and the respective ideal binary X and binary Y components of the symbols, and;
calculating new equalization constants based upon the generated error X and error Y factor and the binary X and binary Y components of received symbols.

6. The method of claim 5 wherein said generating step includes:
normalizing the equalized binary X and binary Y components to a magnitude and sign indication;
locating the area of the phase plane in which the received symbol belongs by use of the normalized binary X and binary Y components; and
generating the X component and Y component of the ideal point in the area of the phase plane occupied by the symbol.

7. The method of claim 6 wherein said locating step, comprises: addressing a memory with the magnitude indication of the binary X and binary Y components of the symbol to retrieve a first quadrant area indication.

8. The method of claim 7 wherein said X and Y component generating step, comprises: addressing a memory with the first quadrant area indication and binary X and binary Y component sign indications to retrieve the X component and Y component of the ideal point in the area of the phase plane occupied by the received symbol.

9. The method of claim 6 further comprising:
generating the phase angle of the ideal point in the area of the phase plane occupied by the received symbol;
subtracting said generated phase angle from the phase angle generated for the previous received symbol to get a phase difference; and
converting the phase difference to digital data.

10. The method of claim 9 wherein said locating step, comprises: addressing a first memory with the magnitude of the normalized binary X and binary Y components of the symbol to retrieve a first quadrant area indication.

11. The method of claim 10 wherein said generating the X component and Y component step, comprises:
 addressing a second memory with the first quadrant area indication and binary X and binary Y component sign indication to retrieve the X component and Y component of the ideal point in the area of the phase plane occupied by the symbol.

12. The method of claim 11 wherein said generating the phase angle of ideal point step, comprises: addressing said second memory with the first quadrant area indication and binary X and binary Y component sign indication to retrieve the phase angle of the ideal point.

13. A method for correcting the delay and amplitude distortion created in double-sideband modulated signals propagated in voice-band transmission channels, comprising:
 converting a received symbol into its corresponding binary X and binary Y components;
 storing the binary X and binary Y components of the received symbol;
 prior to reception of the next symbol, calculating equalization constants based on N, (N being any positive integer equal or greater than 1) previously received binary X and binary Y symbol components and a previously calculated error X and error Y factor;
 prior to reception of the next symbol, equalizing a stored binary X and binary Y set of components of a received symbol according to the calculated equalization constants;
 prior to reception of the next symbol, comparing the equalized binary X and binary Y components of the symbol with its respective ideal binary X and binary Y components;
 prior to reception of the next symbol, calculating an error X and error Y factor by taking the difference between the equalized binary X and binary Y components and the ideal binary X and binary Y components of the symbol; and
 storing the calculated error X and error Y factors for use in calculating new equalization constants.

14. The method of claim 13 wherein said comparing step, includes:
 normalizing the equalized binary X and binary Y components to a magnitude and sign indication;
 locating the area of the phase plane in which the received symbol belongs by use of the normalized binary X and binary Y components; and
 generating the X component and Y component of the ideal point in the area of the phase plane occupied by the symbol in response to the located phase plane area.

15. In a double-sideband modulated carrier system for use with communication channels, said system having means for converting a received analog symbol into corresponding binary X and binary Y components, apparatus for correcting for the phase and amplitude distortion characteristic of said communication channels, comprising:
 means for equalizing the binary X and binary Y components of the received symbols according to previously generated equalization constants;
 means for generating the difference between the equalized components of said received symbol and the ideal binary X and binary Y components of said symbol; and
 means utilizing the signals from the difference generating means and the binary X and binary Y components of the received symbol for generating modified equalization constants.

16. The apparatus of claim 15 wherein said difference generating means, comprises:
 means for locating the area of the phase plane in which the received symbol belongs by use of the equalized binary X and binary Y components;
 means for generating the X component and Y component of the ideal point in the area of the phase plane occupied by the received symbol; and
 means for substracting the X component and Y component of the ideal point from the equalized X component and Y component, respectively, to obtain an error X and error Y value.

17. The apparatus of claim 15 wherein said modified equalization constant generating means, comprises:
 means for generating a change of correction factor by using the output from said difference generating means and the unequalized binary X and binary Y components of said received symbol;
 means for generating a new correction constant by use of the change of correction factor;
 means for generating a change of equalization factor by use of the new correction constant; and
 means for modifying the equalization constant according to the change of equalization factor.

18. The apparatus of claim 16 further comprising:
 means for generating the phase angle of the received symbol in response to the equalized binary X and binary Y components of the received symbol;
 means for subtracting the generated phase angle from the phase angle generated for the previously received symbol to get a phase change; and
 means for converting the phase change to digital data.

19. In a double-sideband modulated carrier system for use with voice-band communication channels, said system having means for converting a received analog symbol into corresponding binary X and binary Y components, apparatus for correcting for the phase and amplitude distortion characteristic of said communication channels, comprising:
 means for storing the binary X and binary Y components of the received symbol;
 means for calculating equalization constants based on N (N being any positive non-zero integer) previously received binary X and binary Y symbol components and a previously calculated error X and error Y factor, prior to reception of the next symbol;
 means for equalizing the binary X and binary Y components of a received symbol according to the calculated equalization constants, prior to reception of the next symbol;
 means for comparing the equalized binary X and binary Y component of the symbol with its respective ideal binary X and binary Y components, prior to reception of the next symbol;
 means for calculating an error X and error Y factor from the difference between the equalized binary X and binary Y components and the ideal binary X and binary Y components, prior to reception of the next symbol; and means for storing the calculated error X and error Y factor for use in calculating new equalization constants upon reception of the next symbol.

20. The apparatus of claim 19 wherein said comparing means, comprises:

means for normalizing the equalized binary X and binary Y components to separate magnitude and sign indications;

means for identifying the area of the phase plane in which the received symbol belongs by use of the normalized binary X and binary Y components; and means for generating the X component and Y component of the ideal point in the area of the phase plane occupied by the symbol in response to the identified phase plane.

21. The apparatus of claim 20 wherein said identifying means, comprises: a memory means addressable by the magnitude of the binary X and binary Y components, said memory means containing first quadrant phase plane area indications in which the symbol could belong.

22. The apparatus of claim 21 wherein said generating means, comprises: a memory means addressable by the first quadrant phase plane area indication and the binary X and binary Y component sign indications, said memory means containing the X component and Y component of the ideal point in the area of the phase plane occupied by the symbol.

23. The apparatus of claim 20, further comprising:

means for generating the phase angle of the ideal point in the area of the phase plane occupied by the symbol, in response to the identified phase plane area of the received symbol;

means for storing the generated phase angle;

means for subtracting the generated phase angle from the phase angle generated for a previous received symbol in said storing means; and means for converting the difference from said subtracting means to digital data.

24. The apparatus of claim 23 wherein said identifying means, comprises: a memory means addressable by the magnitude of the binary X and binary Y components, said memory means containing first quadrant phase plane are indications in which the received symbol could belong.

25. The apparatus of claim 24 wherein said generating means, comprises: a memory means addressable by the first quadrant phase plane area indication and the binary X and binary Y component sign indications, said memory means containing the X component and Y component of the ideal point in the area of the phase plane occupied by the received symbol.

26. In a double-sideband modulated carrier system for use with voice-band-communication channels, said system having means for converting a received analog symbol into corresponding binary X and binary Y components, apparatus for compensating for phase and amplitude distortion in said channel said apparatus including:

means for equalizing the binary X and binary Y components;

first memory means responsive to the equalized binary X and binary Y components of the received symbols for generating an address indication; and second memory means responsive to the address indication from said first memory means for generating data represented by the equalized X and Y symbol components addressing said first memory means.

27. In a modulated carrier system for use with a communication channel, said system having means for converting a received analog symbol into corresponding binary X and binary Y components, said channel exhibiting a phase and amplitude distortion characteristic apparatus for compensating for the phase and amplitude distortion in said channel said apparatus including:

means for equalizing the binary X and binary Y components;

first memory means responsive to the equalized binary X and binary Y components of the received symbols for generating an address indication; and second memory means responsive to the address indication from said first memory means for generating ideal binary X and binary Y symbols represented by the equalized X and Y symbol components addressing said first memory means.

28. The apparatus of claim 27 wherein said apparatus for compensating further includes:

means for equalizing the binary X and binary Y components of the received symbols according to previously defined equalization constants;

means for generating the difference between the equalized components of said received symbol and the ideal binary X and binary Y components of said symbol; and means utilizing the signals from the difference generating means for generating modified equalization constants.

29. The apparatus of claim 28 wherein said modified equalization constant generating means, comprises:

means for generating a change of correction factor by using the output from said difference generating means and the unequalized binary X and binary Y components;

means for generating a new correction constant by use of the change of correction factor;

means for generating a change of equalization factor by use of the new correction constant; and means for modifying the equalization constant according to the change of equalization factor.

30. In a modulated carrier system for use with a communication channel, said system having means for converting a received analog symbol into corresponding binary X and binary Y components, a method for correcting for the phase and amplitude distortion characteristic of said channel, comprising:

equalizing the binary X and binary Y components of the received symbol according to previously defined equalization constants;

generating the difference between the equalized components of said received symbol and the ideal binary X and binary Y components of said symbol; and modifying the equalization constants by utilizing the difference between the equalized binary X and binary Y components and their respective ideal binary X and binary Y components, and the binary X and binary Y components of the received symbol.

31. The method of claim 30 wherein said generating step includes:

locating the area of the phase plane in which the received symbol belongs by use of the equalized binary X and binary Y components;

generating the ideal binary X and ideal binary Y component in the area of the phase plane occupied by the received symbol; and subtracting the ideal X component and ideal Y component from the equalized X component and Y component, respectively, to obtain an error X and error Y value.

32. The method of claim 30 wherein said modifying step includes:

generating a change of correction of factor for the X and Y components, respectively, by using the difference between the corrected binary X and binary Y components and the ideal binary X and binary Y components, and the recieved unequalized binary X and binary Y components;

generating a new correction constant by use of the newly generated change of correction factor;

generating a change of equalization factor by use of the new correction constant; and modifying the equalization constants according to the newly generated change of equalization factor.

33. The method of claim 30 further comprising:

generating the ideal phase angle of the received symbol in response to the equalized binary X and binary Y components of the received symbol;

subtracting the generated phase angle from the ideal phase angle generated for the previously received symbol to get a phase change; and converting the phase change to digital data.

* * * * *

UNITED STATES PATENT AND TRADEMARK OFFICE
CERTIFICATE OF CORRECTION

PATENT NO. : 4,035,625
DATED : July 12, 1977
INVENTOR(S) : Ran-Fun Chiu, James Bryon Sherman, Judson T. Gilbert It is certified that error appears in the above-identified patent and that said Letters Patent are hereby corrected as shown below:

In the Abstract, line 19, after "a", insert --two--.

In Column 2, line 24, after "symbol", insert --based--

In Column 3, line 11, "numeals" should be --numerals--.

In Column 4, line 6, "sinal" should be --signal--.

In Column 5, line 40, "Modem" should be --modem--.

In Column 5, line 53, "Modem" should be --modem--.

In Column 6, line 2, "the" should be --The--.

In Column 6, line 28, "AT" should be --At--.

In Column 6, line 42, after "on line 179", insert --and Y--.

In Column 6, line 44, "formed" should be --forced--.

In Column 7, line 18 (2nd equation), "=", first occurrence, should be -- - --.

In Column 8, line 36, after "on line", insert --241--; delete "and Y data".

UNITED STATES PATENT AND TRADEMARK OFFICE
CERTIFICATE OF CORRECTION

PATENT NO. : 4,035,625
DATED : July 12, 1977
INVENTOR(S) : Ran-Fun Chiu, James B. Sherman, Judson T. Gilbert It is certified that error appears in the above-identified patent and that said Letters Patent are hereby corrected as shown below:

In Column 9, line 31, after "within", insert --which--.

In Column 10, line 28, "fromm" should be --from--.

In Column 10, line 50, "SYNBOL" should be --SYMBOL--.

In Column 10, line 58, "the" should be --to--.

In Column 11, line 25, "On" should be --on--.

In Column 12, line 4, "long" should be --along--.

In Column 12, line 57, "product" should be --produce--.

In Column 13, line 20, "269" should be --369--.

In Column 13, line 55, "2+s" should be --2's--.

In Column 16, line 7, "y" should be --Y--.

In Column 16, line 11, after "9", insert --through 16--.

In Column 16, line 19, "result of" should be --result is--.

UNITED STATES PATENT AND TRADEMARK OFFICE
CERTIFICATE OF CORRECTION

PATENT NO. : 4,035,625

DATED : July 12, 1977

INVENTOR(S) : Ran-Fun Chiu, James B. Sherman, Judson T. Gilbert

It is certified that error appears in the above-identified patent and that said Letters Patent are hereby corrected as shown below:

In Column 16, line 44, "of", second occurrence, should be --on--.

In Column 17, line 33, "terminal" should be --terminals--.

In Column 17, line 57, "laded" should be --loaded--.

In Column 18, line 17, "represented" should be --presented--.

In Column 18, line 23, "from" should be --form--.

In Column 18, line 44, "infomation" should be --information--.

In Column 18, line 47, "one" should be --on--.

In Column 19, line 27, "there" should be --these--.

In Column 19, line 30, "EXECUTIVE" should be --EXECUTION--.

In Column 19, line 44, after "serial", insert --adder--.

UNITED STATES PATENT AND TRADEMARK OFFICE
CERTIFICATE OF CORRECTION

PATENT NO. : 4,035,625
DATED : July 12, 1977
INVENTOR(S) : Ran-Fun Chiu, James B. Sherman, Judson T. Gilbert It is certified that error appears in the above-identified patent and that said Letters Patent are hereby corrected as shown below:

In Column 19, line 64, after "the", third occurrence, insert --two--.

In Column 19, line 66, after "storage", insert --register--.

In Column 20, line 28, "$\Delta Cp$" should be --$\Delta CP$--.

In Column 20, line 56, "on" should be --of--.

In Column 20, line 66, "updated" should be --updating--.

UNITED STATES PATENT AND TRADEMARK OFFICE
CERTIFICATE OF CORRECTION

PATENT NO. : 4,035,625
DATED : July 12, 1977
INVENTOR(S) : Ran-Fun Chiu, James B. Sherman, Judson T. Gilbert It is certified that error appears in the above-identified patent and that said Letters Patent are hereby corrected as shown below:

In Column 21, line 9, "in" should be --of--.

In Column 21, line 14, "in" should be --is--.

In Column 24, line 33, "16" should be --15--.

In Column 25, line 47, "are" should be --area--.

In Column 28, line 1, "recieved" should be --received--.

Signed and Sealed this
Fourth Day of April 1978

[SEAL]

Attest:

RUTH C. MASON
Attesting Officer

LUTRELLE F. PARKER
Acting Commissioner of Patents and Trademarks